(12) United States Patent
Yasuoka

(10) Patent No.: US 9,195,688 B2
(45) Date of Patent: Nov. 24, 2015

(54) TABLE PROCESSING APPARATUS AND METHOD FOR JOINING TWO TABLES

(71) Applicant: FUJITSU LIMITED, Kawasaki (JP)

(72) Inventor: Yoshihiro Yasuoka, Fuji (JP)

(73) Assignee: FUJITSU LIMITED, Kawasaki (JP)

( * ) Notice: Subject to any disclaimer, the term of this patent is extended or adjusted under 35 U.S.C. 154(b) by 400 days.

(21) Appl. No.: 13/721,149

(22) Filed: Dec. 20, 2012

(65) Prior Publication Data

US 2013/0179470 A1 Jul. 11, 2013

(30) Foreign Application Priority Data

Jan. 11, 2012 (JP) .................................. 2012-003382

(51) Int. Cl.
*G06F 7/00* (2006.01)
*G06F 17/30* (2006.01)

(52) U.S. Cl.
CPC .... *G06F 17/30292* (2013.01); *G06F 17/30014* (2013.01); *G06F 17/30327* (2013.01); *G06F 17/30498* (2013.01)

(58) Field of Classification Search
None
See application file for complete search history.

(56) References Cited

U.S. PATENT DOCUMENTS

| 5,355,473 | A | * | 10/1994 | Au ........................................ 1/1 |
| 5,551,031 | A | | 8/1996 | Cheng et al. |
| 5,557,791 | A | | 9/1996 | Cheng et al. |
| 7,730,055 | B2 | | 6/2010 | Bellamkonda et al. |
| 2003/0033278 | A1 | | 2/2003 | Abe et al. |
| 2004/0114587 | A1 | * | 6/2004 | Huang et al. ................... 370/389 |
| 2006/0129515 | A1 | | 6/2006 | Nagata et al. |
| 2010/0125711 | A1 | | 5/2010 | Kinomura et al. |
| 2012/0066207 | A1 | * | 3/2012 | Ochi et al. .................... 707/714 |
| 2013/0311445 | A1 | * | 11/2013 | Narita ............................ 707/714 |

FOREIGN PATENT DOCUMENTS

| EP | 0529916 A2 | 3/1993 |
| JP | H5-197763 | 8/1993 |
| JP | 2003-44267 A | 2/2003 |
| JP | 2006-171800 A | 6/2006 |
| JP | 2010-108093 A | 5/2010 |
| JP | 2010-277556 | 12/2010 |

OTHER PUBLICATIONS

Goetz Graefe, "New algorithms for join and grouping operations," Comput Sci Res Dev., Special Issue Paper, pp. 3-27 (Jun. 30, 2011).

(Continued)

*Primary Examiner* — Uyen Le
(74) *Attorney, Agent, or Firm* — Fujitsu Patent Center

(57) ABSTRACT

When a key of a first record in a first table is entered in a trie tree in which keys of a plurality of records in a second table are entered, a computer generates a third record by using the first record and a second record in the second table. The second record includes the key of the first record. A link to a leaf corresponding to the second record is deleted from an array which stores links to a plurality of leaves of the trie tree corresponding to the records. When a key of a fourth record in the first table is not entered in the trie tree, a fifth record is generated by using the fourth record. Then, a seventh record is generated by using a sixth record in the second table corresponding to a leaf linked by a link remaining in the array.

5 Claims, 29 Drawing Sheets

(56) References Cited

OTHER PUBLICATIONS

Jianhua Feng etal., "Trie-join: a trie-based method for efficient string similarity joins," The VLDB Journal, pp. 437-461 (Oct. 4, 2011).

Extended European Search Report dated May 10, 2013, issued in corresponding European Patent Application No. 12199108.7.

* cited by examiner

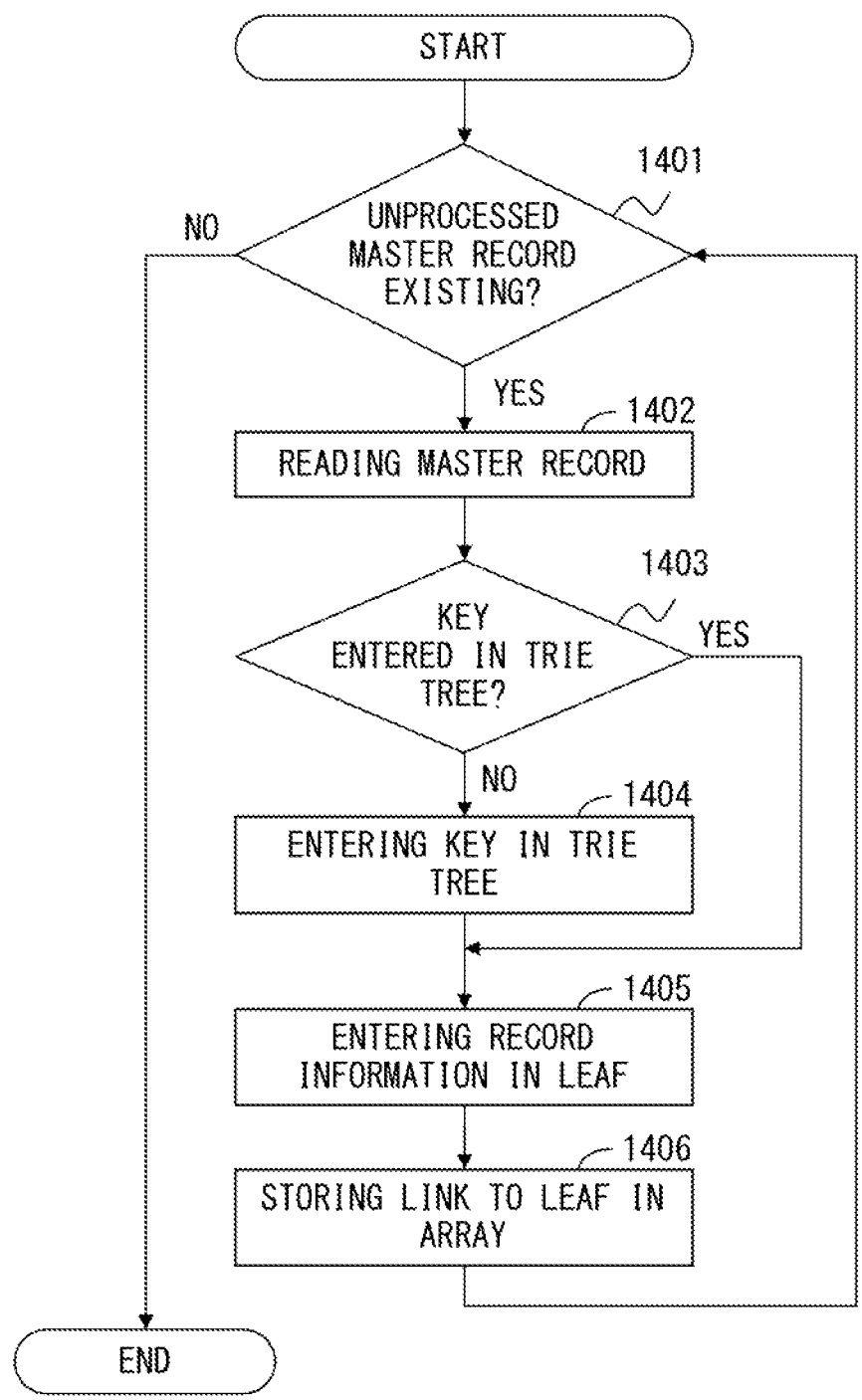
F I G. 14

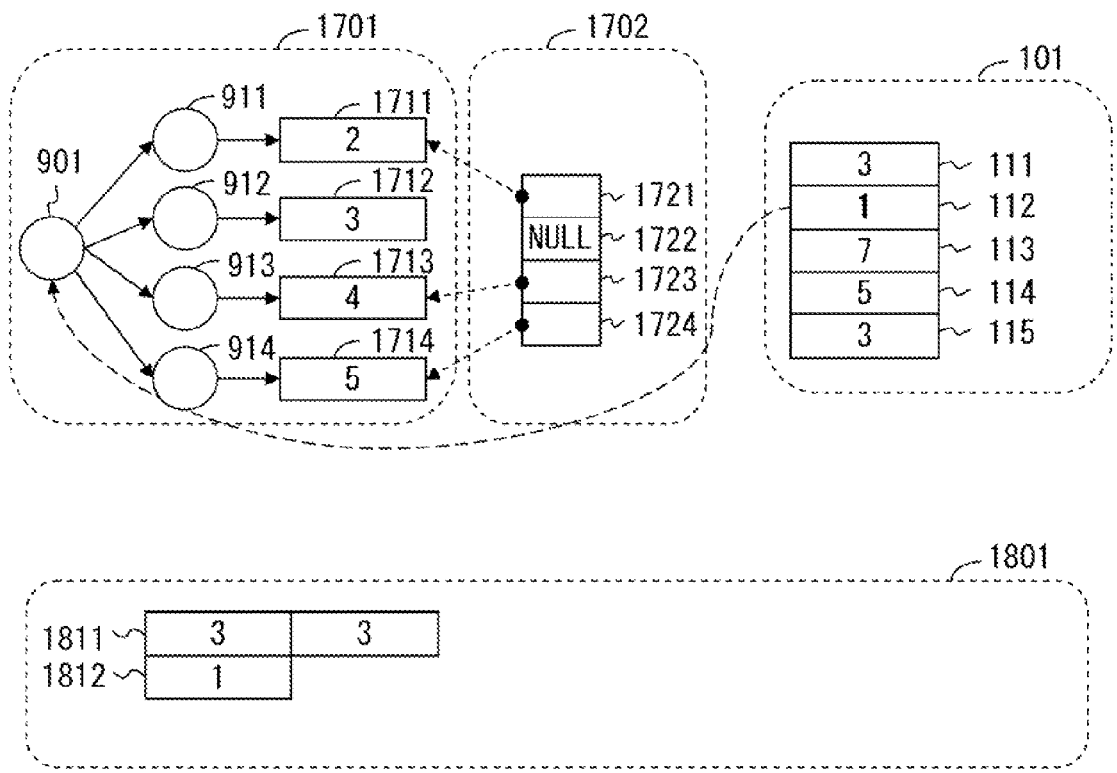
F I G. 19

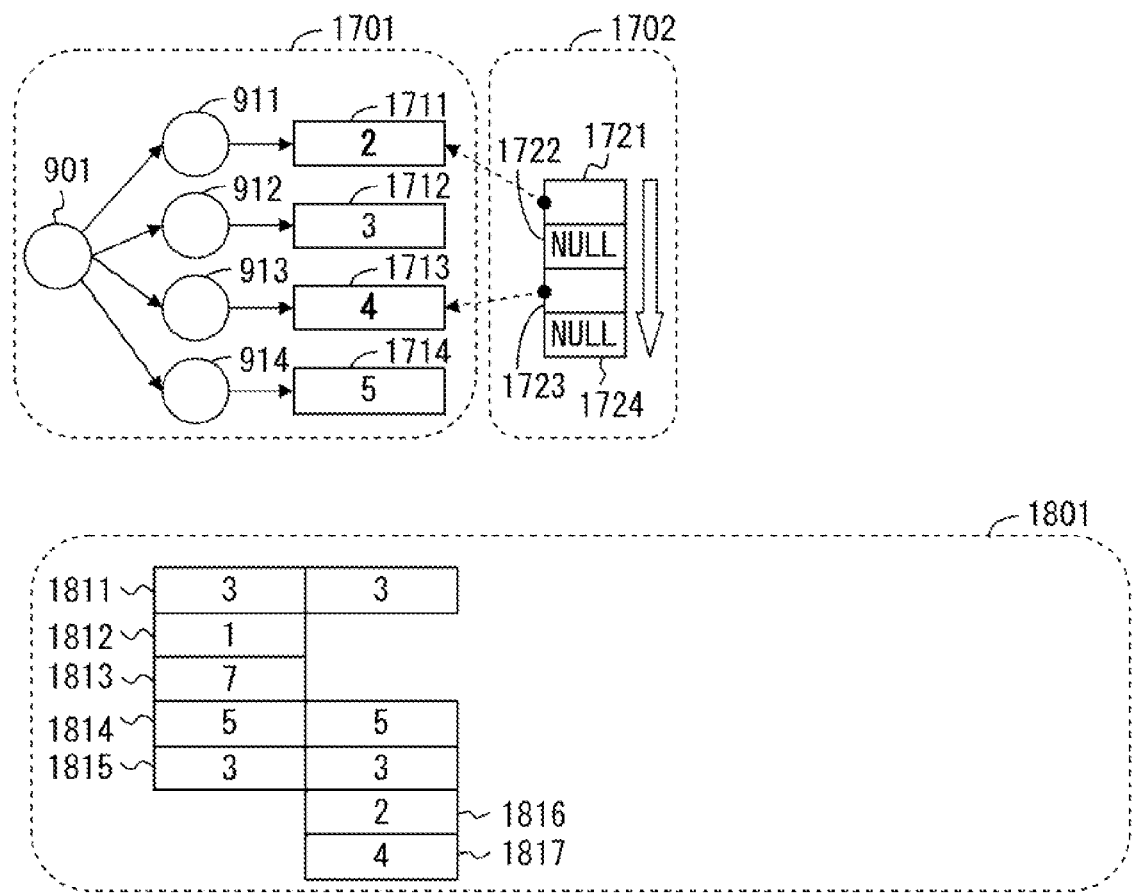
F I G. 2 1

| | CODE | PRODUCT NAME | PRICE |
|---|---|---|---|
| 2201 | A01 | PENCIL | 60 |
| 2202 | A02 | RED PENCIL | 100 |
| 2203 | A03 | ERASER | 80 |

FIG. 22

| | DATE | PRODUCT NUMBER | NUMBER OF PRODUCTS |
|---|---|---|---|
| 2301 | 2011/10/10 | A03 | 3 |
| 2302 | 2011/10/10 | A01 | 24 |
| 2303 | 2011/10/11 | A04 | 1 |
| 2304 | 2011/10/12 | A01 | 60 |

FIG. 23

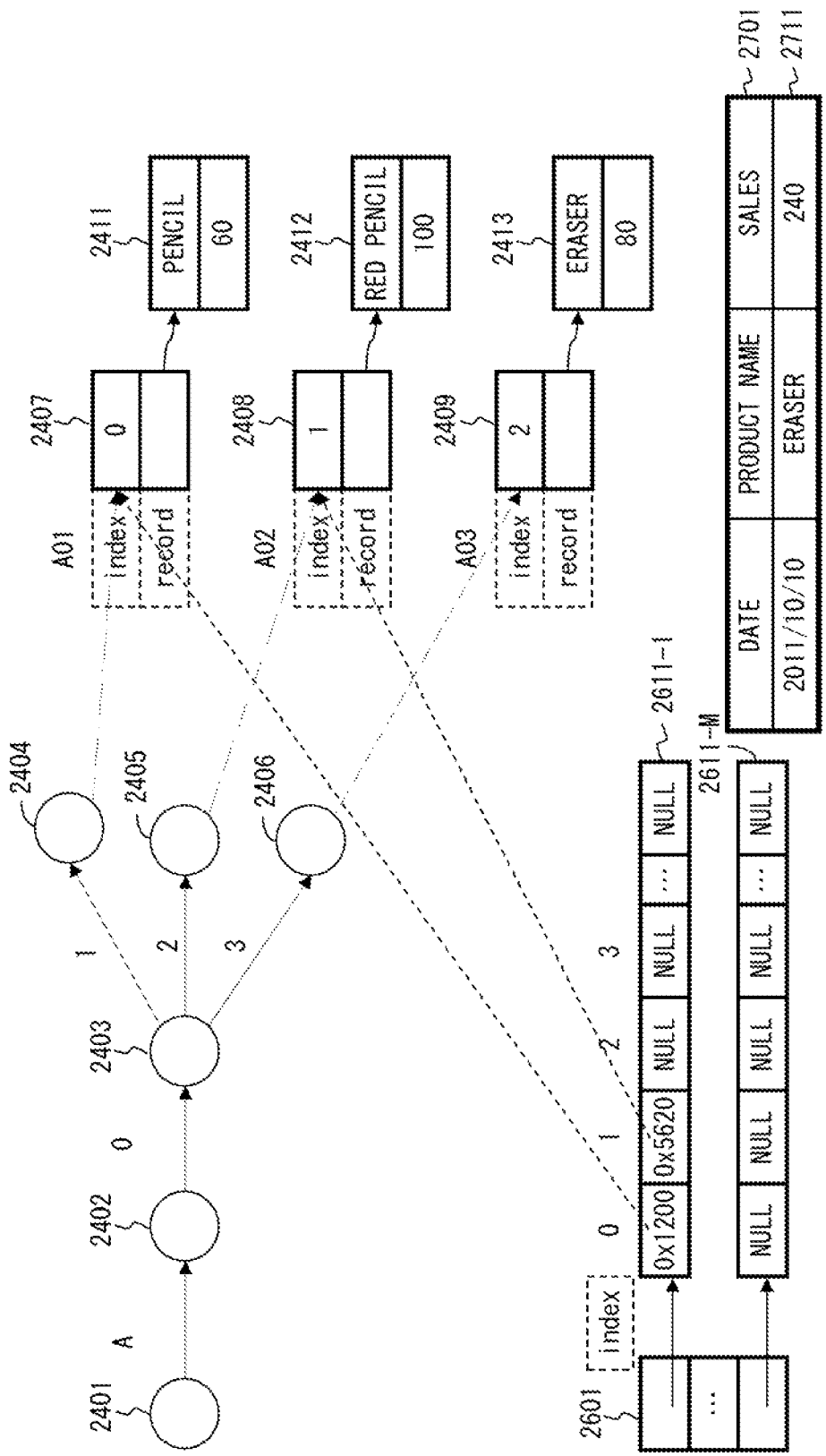
F I G. 27

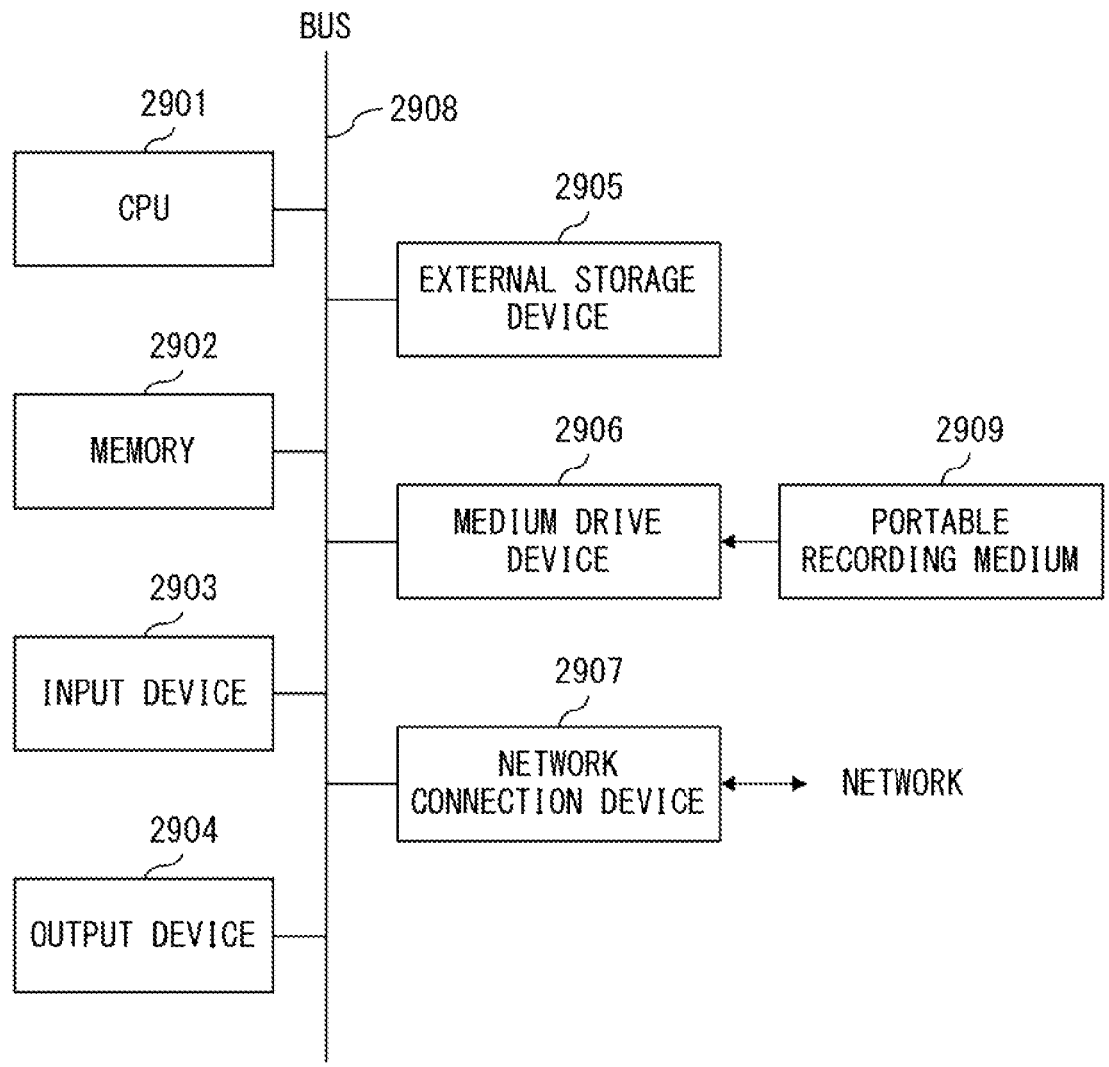
F I G. 2 9

TABLE PROCESSING APPARATUS AND METHOD FOR JOINING TWO TABLES

CROSS-REFERENCE TO RELATED APPLICATION

This application is based upon and claims the benefit of priority of the prior Japanese Patent Application No. 2012-003382, filed on Jan. 11, 2012, the entire contents of which are incorporated herein by reference.

FIELD

The embodiments discussed herein are related to a table processing apparatus, a table processing method and a recording medium.

BACKGROUND

With the data of a database system and a file of an information processing apparatus (computer) etc., an encoded column may be replaced with a name or a plurality of different types records may be coupled to generate a record. An example of replacing an encoded column with a name is, for example, a case where a prefecture number is replaced with a prefecture name. An example of a file of an information processing apparatus is, for example, a file in an extensible markup language (XML) format or a comma separated values (CSV) format.

A method for generating a table by joining two unsorted tables may be equi join or non-equi join. In the equi join, when the character strings of the items (fields) as the keys of the records included in two tables match each other, the records are coupled. On the other hand, in the non-equi join, records are coupled using not only the matching key character strings but also other join conditions. As other join conditions, for example, a character string in one table matches a part of a character string in the other cable, a numeric value in one table is included in another's character string a numeric range in the other table, etc.

Furthermore, the type of joining method based on an output record may be inner join, left outer join, full outer join, etc.

FIG. 1 illustrates examples of the inner join, the left outer join, and the full outer join. When a table 103 is generated by joining a journal table 101 and a master table 102 in the inner join, only records 131 through 133 obtained by coupling the record of the journal table 101 with the record of the master table 102 are output as the records of the table 103. The record 131 is obtained by coupling a record 111 of the journal table 101 with a record 123 of the master table 102, and a record 132 is obtained by coupling a record 115 of the journal table 101 with the record 123 of the master table 102. A record 133 is obtained by coupling a record 114 of the journal table 101 with a record 124 of the master table 102.

On the other hand, in addition to the records 131 through 133, uncoupled records 112 and 113 of the journal table 101 are also output as records 134 and 135 of the table 103 in the left outer join. Furthermore, in the full outer join, uncoupled records 122 and 121 of the master table 102 are also output as records 136 and 137 of the table 103 in addition to the records 131 through 135.

Furthermore, merge join is well known as the full outer join capable of realizing the equi join and the non-equi join. In the merge join, the records to be joined in two tables are sorted and then coupled.

FIGS. 2 through 8 illustrate examples of the merge join. First, as illustrated in FIG. 2, the records 111 through 115 of the journal table 101 and the records 121 through 124 of the master table 102 are sorted in the ascending order of the values of the records, thereby generating records 201 and 202.

Next, as illustrated in FIG. 3, the leading records 211 and 221 in the tables 201 and 202 are compared with each other. In this case, since the values of the records 211 and 221 do not match each other, the record 211 having a smaller value "1" is output as a record 231 of a table 203.

Next, as illustrated in FIG. 4, the next record 212 in the table 201 is compared with the record 221 of the table 202. In this case, since the values of the records 212 and record 221 do not match each other, the record 221 having a smaller value "2" is output as a record 232 of the table 203.

Next, as illustrated in FIG. 5, the record 212 of the table 201 is compared with the nest record 222 of the table 202. In this case, since the values of the records 212 and record 222 match each other, the records 212 and 222 are coupled, and output as a record 233 of the table 203.

Next, as illustrated in FIG. 6, between a record 213 next to the record 212 and a record 223 next to the record 222, the record 213 having a smaller value "3" is selected as a record to foe compared, and the record 213 is compared with the record 222. In this case, since the values of the records 213 and 222 match each other, the records 213 and 222 are coupled with each other, and output as a record 234 of the table 203.

Next, as illustrated in FIG. 7, between a record 214 next to the record 213 and the record 223 next to the record 222, the record 223 having a smaller value "4" is selected as a record to be compared, and the record 213 is compared with the record 223. In this case, since the values of the records 213 and 223 do not match each other, and the record 213 having a smaller value "3" has already been output, no record is output.

By repeating the above-mentioned comparison and output of the records until the trailing records 215 and 224 of the tables 201 and 202 are reached, all records of the tables 201 and 202 are output as illustrated in FIG. 8. The record 223 of the table 202 is output as a record 235 of the table 203, and the record 215 of the table 201 is output is output as a record 237 of the table 203. In addition, the record 214 of the table 201 is coupled with the record 224 of the table 202, and output as a record 236 of the table 203.

Also known are the data sorting method using the automaton in which a character string as a key of a record is entered and the data aggregating method using statistical Hydra of a trie structure.

Patent Document 1: Japanese Laid-open Patent Publication No. 2003-44267

Patent Document 2: Japanese Laid-open Patent Publication No. 2006-171800

Patent Document 3: Japanese Laid-open Patent Publication No. 2010-108093

SUMMARY

According to an aspect of the embodiments, a computer is directed by a program to perform a process including the following (1) through (5).

(1) When a key of a first record included in a first table is entered in the trie tree in which a plurality of keys of a plurality of records included in a second table are entered, a third record is generated by using the first record and a second record included in the second table. In this case, the second record includes the key of the first record.

(2) A link to a leaf corresponding to the second record is deleted from an array which stores a plurality of links to a plurality of leaves of a trie tree respectively corresponding to the plurality of records.

(3) When a key of a fourth record included in the first table is not entered in the trie tree, a fifth record is generated by using the fourth record.

(4) A seventh record is generated by using a sixth record included in the second table corresponding to a leaf linked by a link remaining in the array.

(5) The third, fifth, and seventh records are output.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 14 is a flowchart of the process of generating a trie tree and an array
FIG. 19 is a view (2) of a first coupling process;
FIG. 21 illustrates a first uncoupled record process;
FIG. 22 illustrates a master table;
FIG. 23 illustrates a journal table;
FIG. 27 illustrates a second coupling process;
FIG. 29 illustrates a configuration of an information processing apparatus.

DESCRIPTION OF EMBODIMENTS

According to the conventional merge join described above, the equi join and the non-equi join may be realized in the full outer join. However, there is the following problem with the merge join.

To join two tables by the merge join, the records of each table are to be sorted before coupling records, thereby taking a specified time to sort the records. Since the records are frequently compared, it takes a long time to compare the records. If the records are coupled without sorting the records, a record of one table is compared with all records of the other table, thereby further increasing the time taken to compare the records.

On the other hand, if records are compared using the automaton of a trie structure with the key of the master table entered or the statistical Hydra, it is considered that the sorting operation is not to be performed. However, in the comparison based on the trie structure of the master table, it is hard to identify the uncoupled record of the master table although the uncoupled record of the journal table may be identified. Therefore, the uncoupled record of the roaster table is not output, and the full outer join is not realized.

The problem above is not limited, to the merge join, but occurs in other table joining methods for generating a record from two tables.

The embodiments are described below in detail with reference to the attached drawings.

Figure 1:
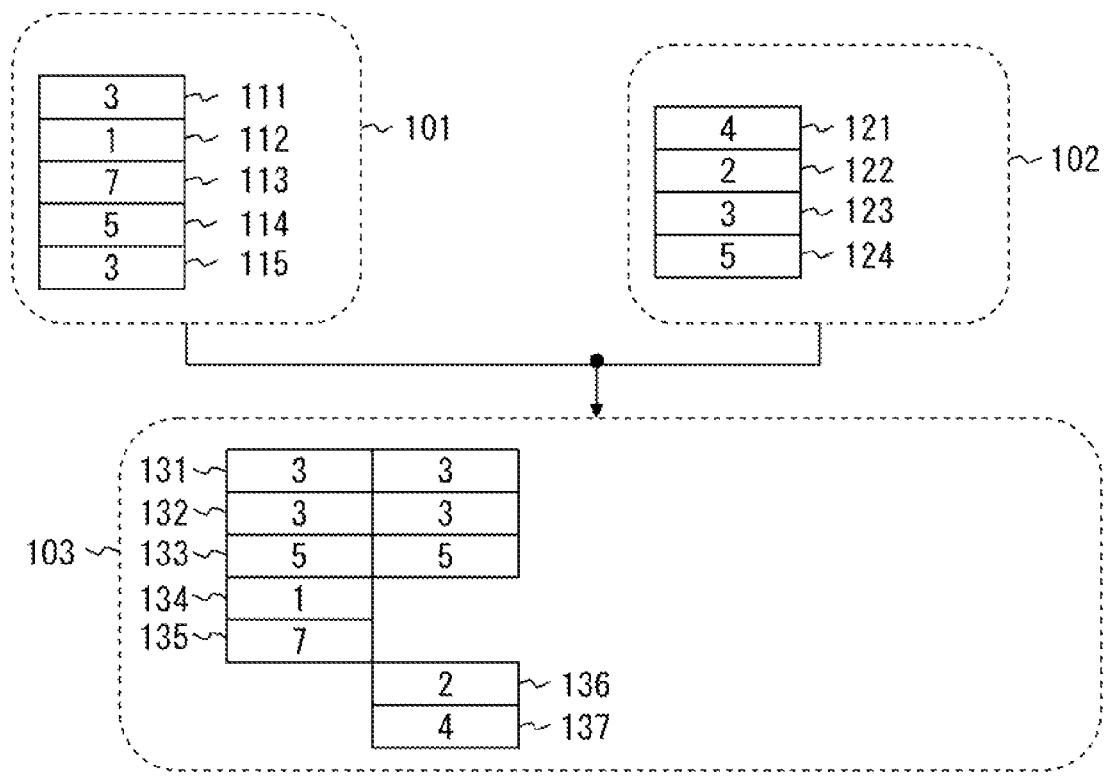
FIG. 1 illustrates inner join, left outer join, and full outer join.
Figure 2:
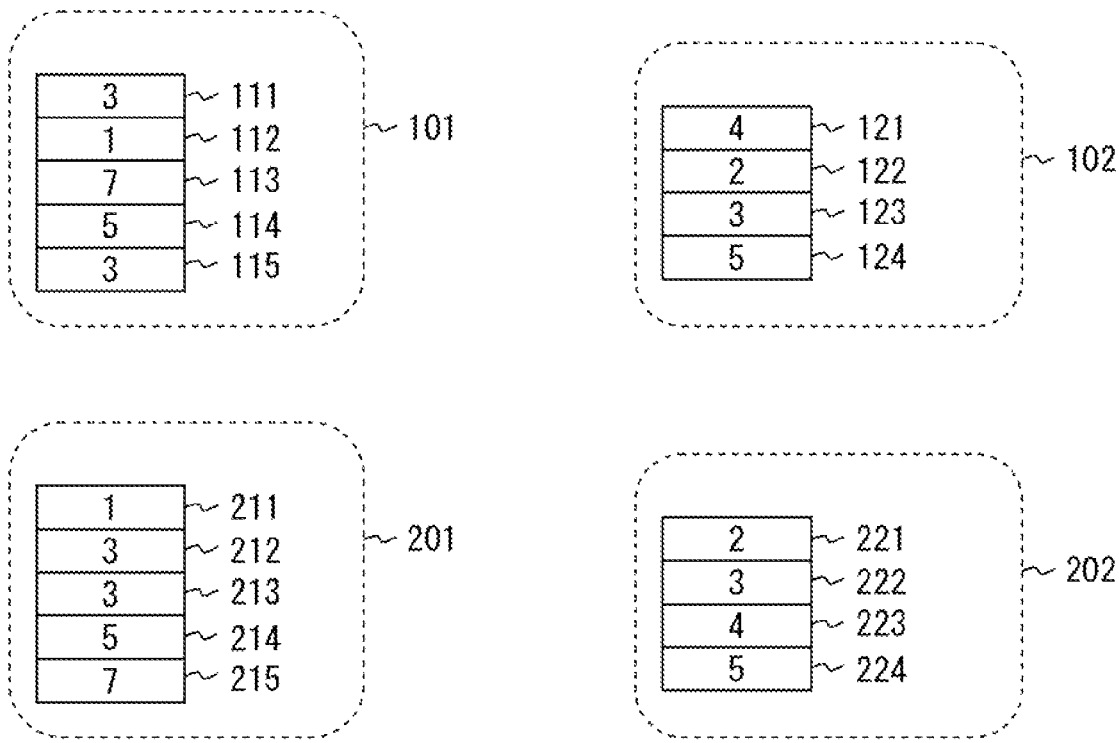
FIG. 2 is a view (1) indicating the merge join.
Figure 3:
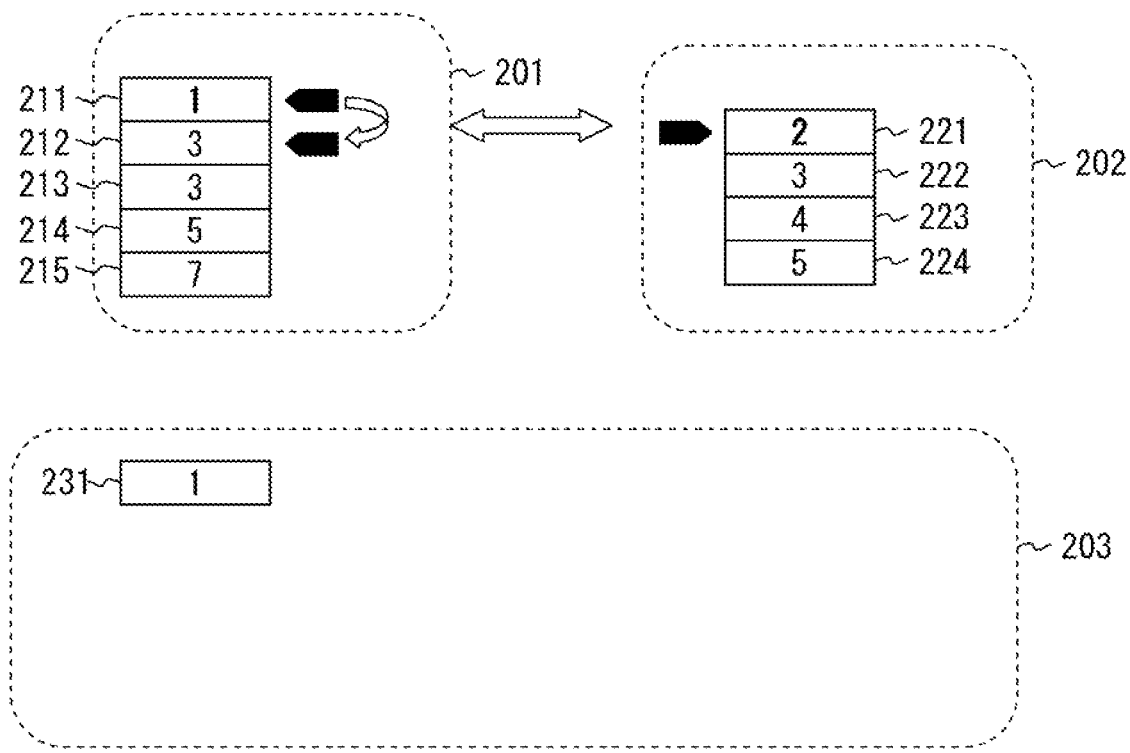
FIG. 3 is a view (2) indicating the merge join.
Figure 4:
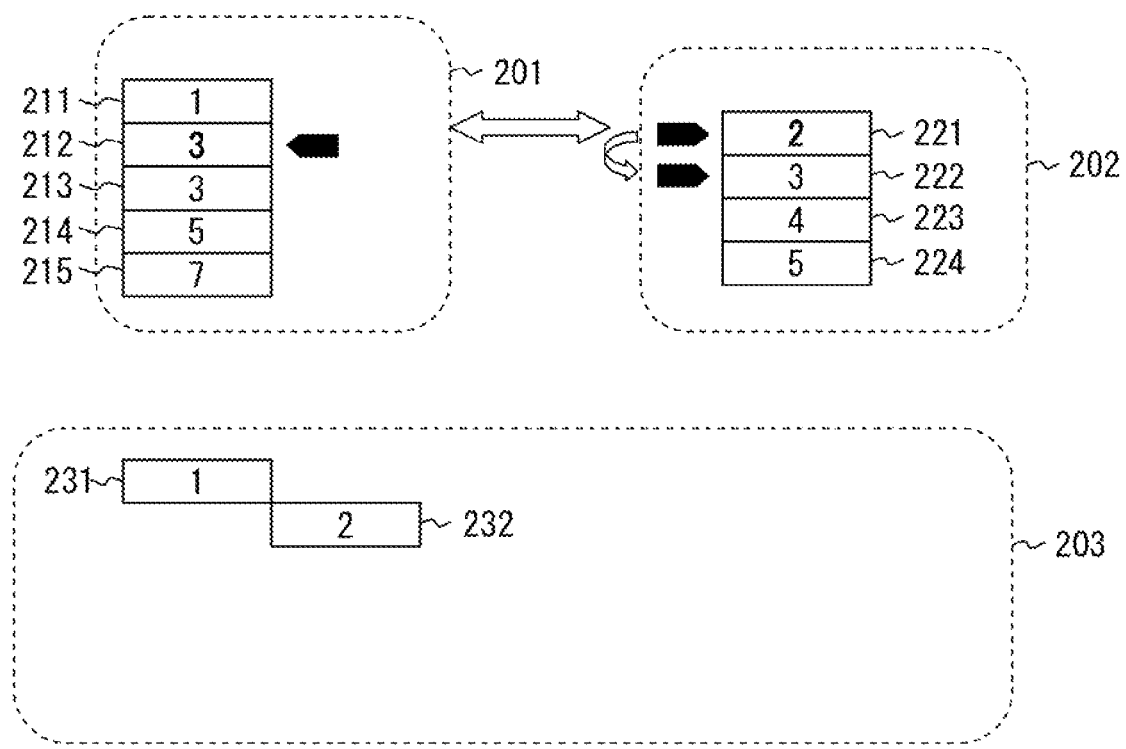
FIG. 4 is a view (3) indicating the merge join.
Figure 5:
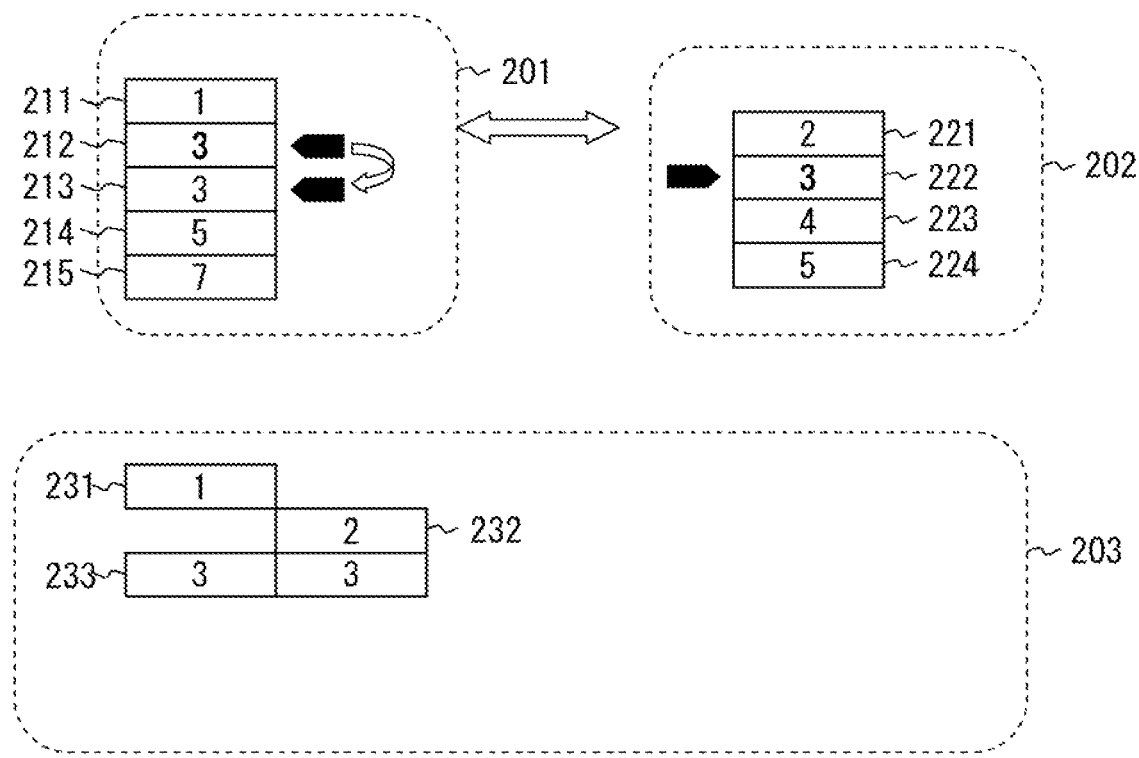
FIG. 5 is a view (4) indicating the merge join.
Figure 6:
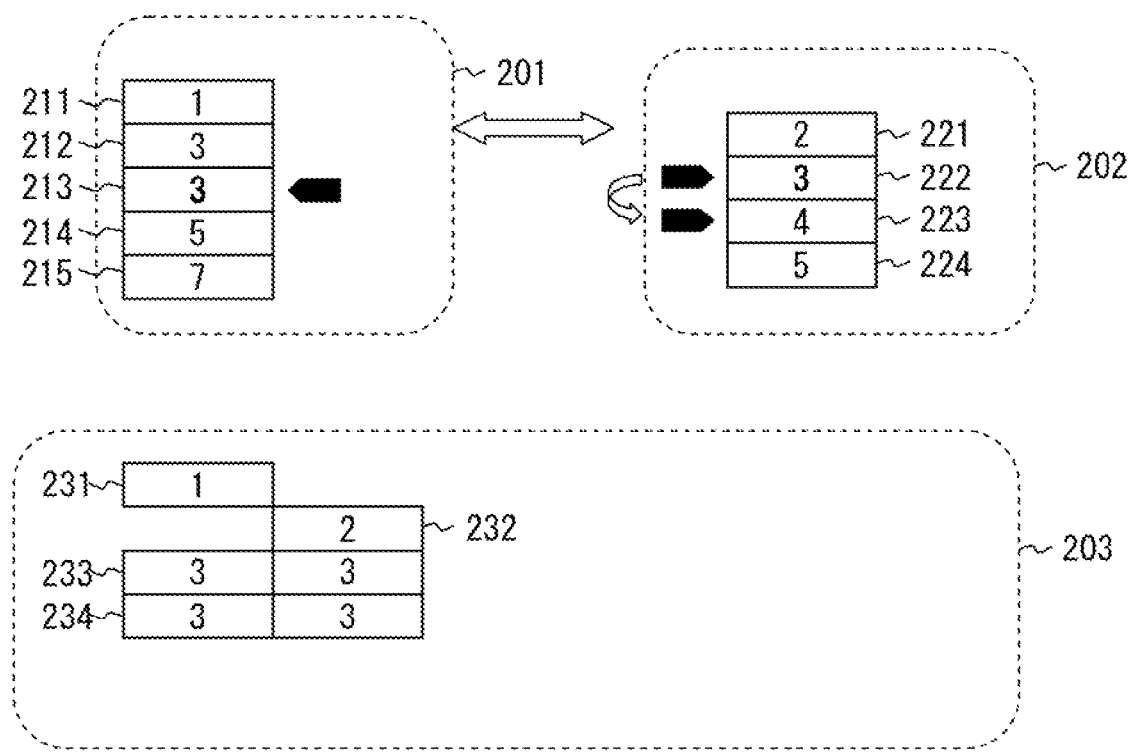
FIG. 6 is a view (5) indicating the merge join.
Figure 7:
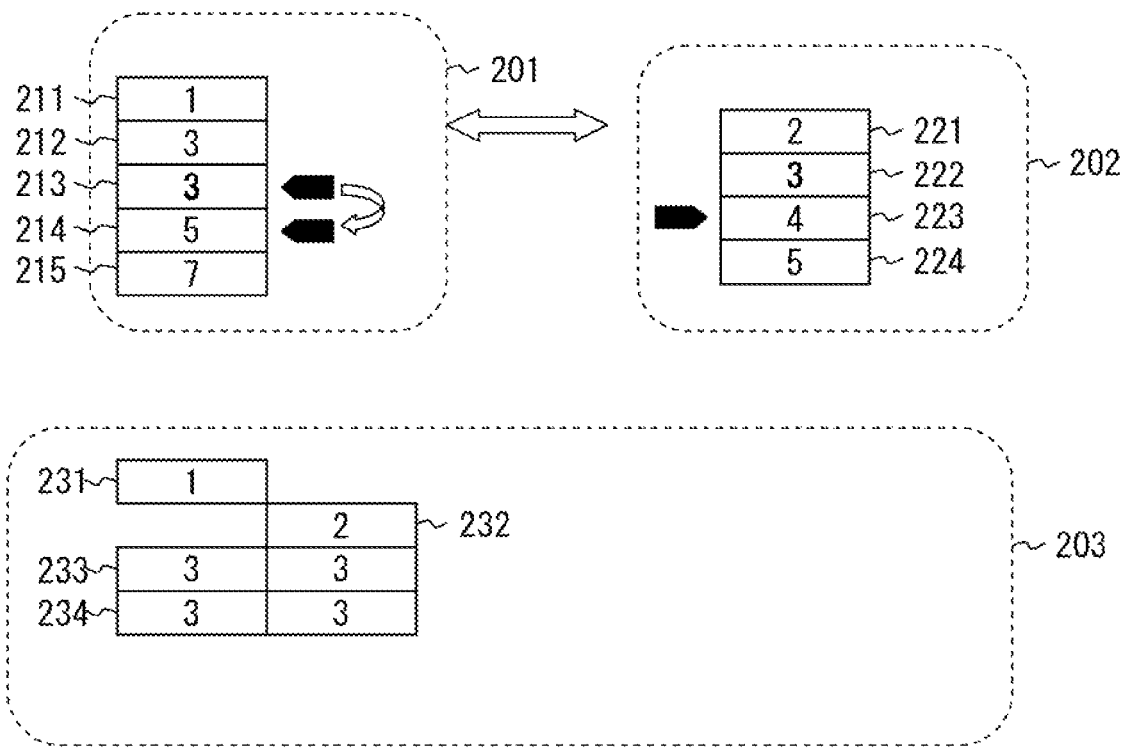
FIG. 7 is a view (6) indicating the merge join.
Figure 8:
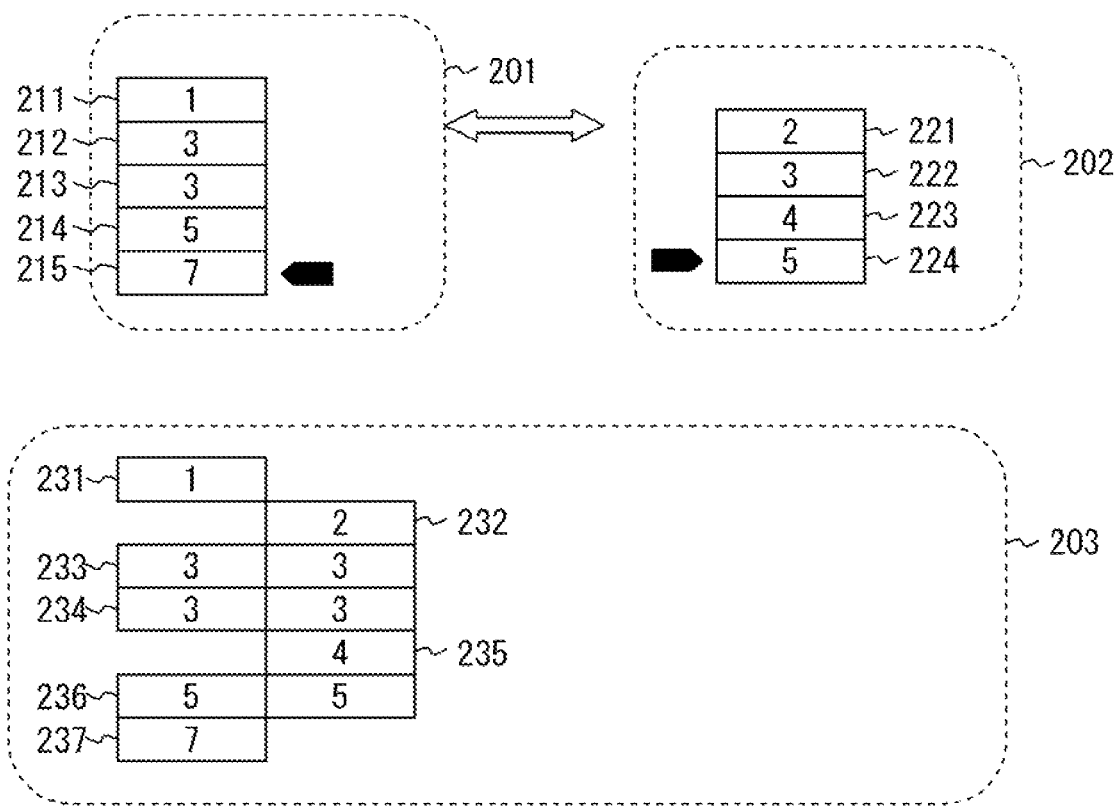
FIG. 8 is a view (7) indicating the merge join.
Figure 9:
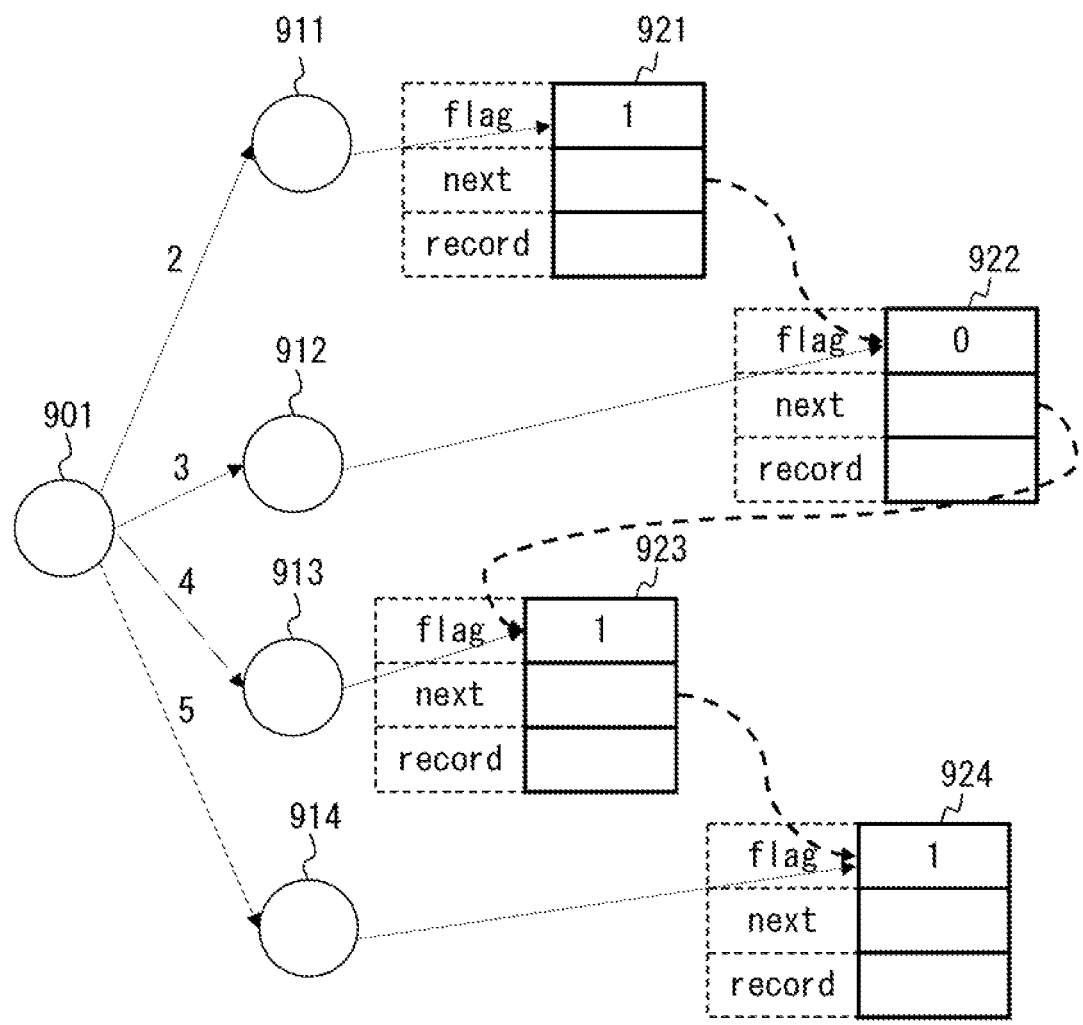
FIG. 9 is a view illustrating a method for identifying an uncoupled record.

FIG. 9 is an example of a method for identifying an uncoupled record of the master table. The trie tree in FIG. 9 includes a leading node 901 and terminal nodes 911 through 914, and the terminal nodes 911 through 914 have the links to the respective leaves 921 through 924 (addresses of the leaves). In the trie tree, the values of the records 121 through 124 of the master table 102 in FIG. 1 are entered as the keys. The trie tree may be called Hydra.

The arrows from the leading node 901 to the terminal nodes 911 through 914 indicate the state transition based on the character string input as a comparison target. In this example, when "2", "3", "4", or "5" is input, the state changes to the terminal node 911, 912, 913, or 914. Each leaf has a flag indicating whether or not the corresponding record is coupled, a link (address of the next leaf) to the next leaf, and a link to the corresponding record (address of the record).

The initial value of a flag is logic "0", and indicates that the corresponding record is uncoupled. In the table joining process, if the value of the record of the journal table 101 matches any value entered in the trie tree, the state transition to the terminal node indicated by the value is performed. Then, the record of the journal table 101 is coupled with the record of the master table 102 corresponding to the leaf of the terminal node at the destination of the transition, and the flag of the leaf is changed to logic "1".

Then, when the comparison between all records of the journal table 101 and the trie tree has been completed, a record corresponding to the leaf having the flag of logic "0" is extracted by tracing the link to the nest leaf from a leaf 921 to a leaf 924. Thus, an uncoupled record of the master table 102 is identified, and the full outer join may be realized.

However, since a list of leaves is traced by the link structure in the method illustrated in FIG. 9, a large memory area is referred to, thereby degrading the efficiency of processing. Thus, a method for efficiently extracting the uncoupled record of the master table is expected.

Figure 10:
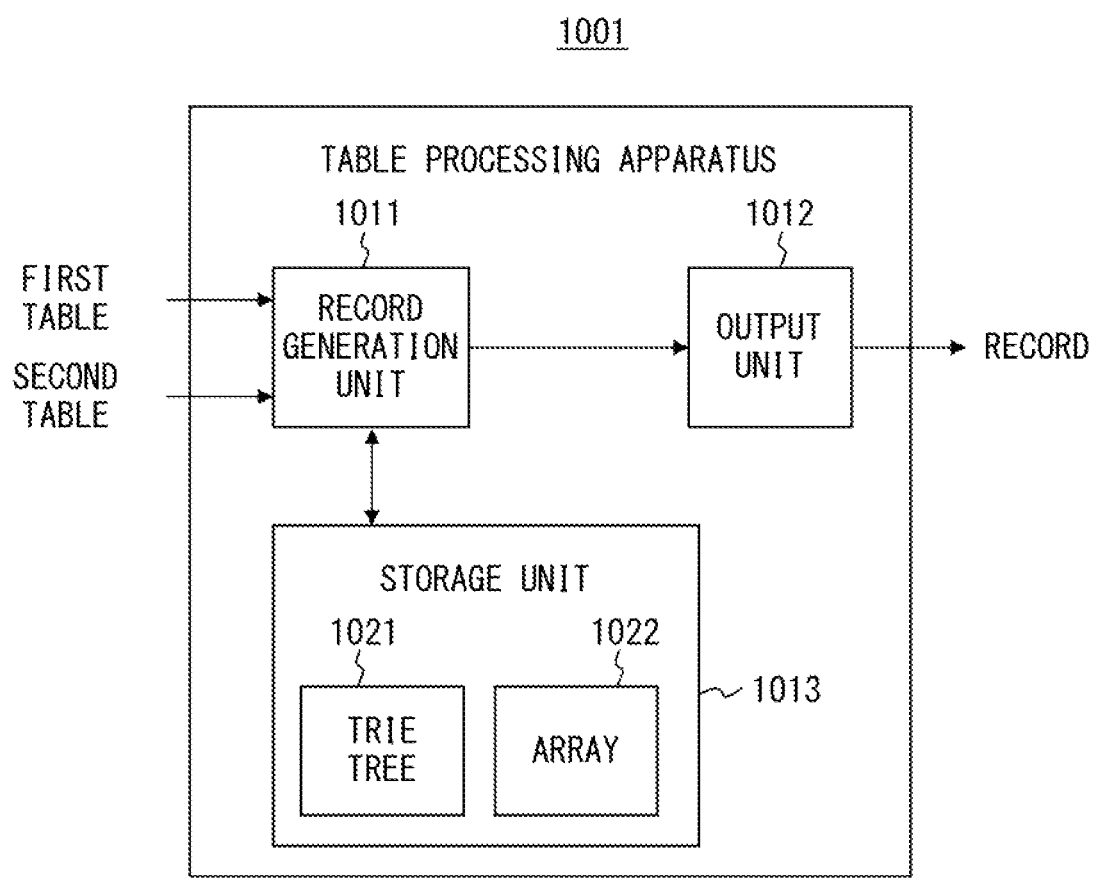
FIG. 10 is a functional configuration of the first table processing apparatus.

FIG. 10 is an example of a functional configuration of the table processing apparatus according to an embodiment. A table processing apparatus 1001 in FIG. 1 includes a record generation unit 1011, an output unit 1012, and a storage unit 1013, and generates a record from the first and second tables. The first table is, for example, a journal table, and the second table is, for example, a master table. The first and second tables may be defined vice versa.

A storage unit 1013 stores a trie tree 1021 in which the keys of a plurality of records included in the second table is entered and an array 1022 of a plurality of links to a plurality of leaves of the trie tree 1021 corresponding to the records.

Figure 11:
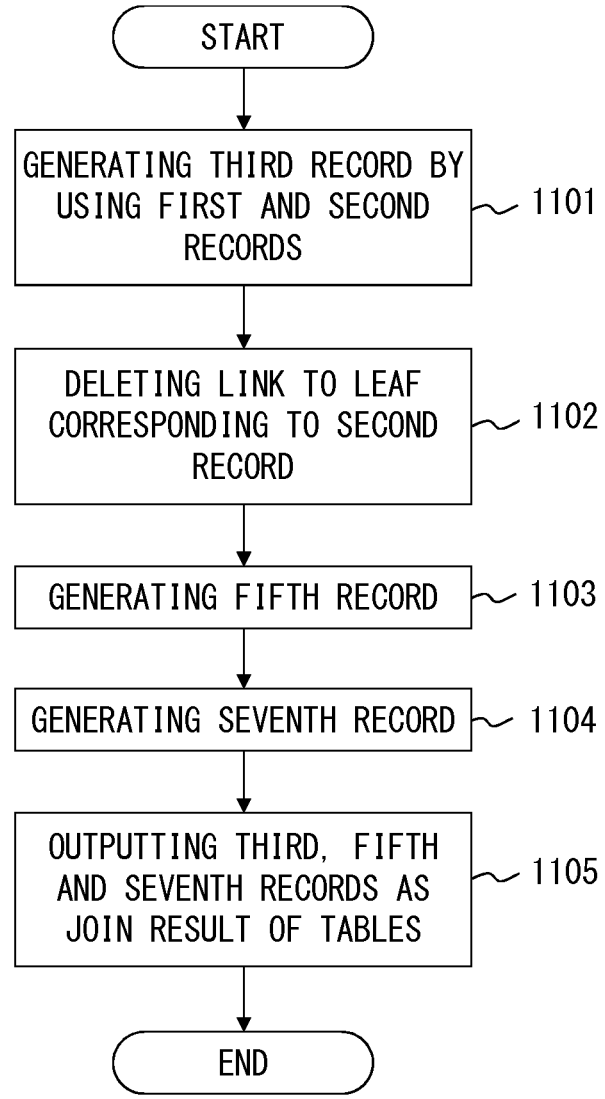
FIG. 11 is a flowchart of a first table joining process.

FIG. 11 is a flowchart indicating an example of a table joining process by the table processing apparatus 1001 in FIG. 10.

The record generation unit 1011 checks whether or not the key of the first record included in the first table is entered in the trie tree 1021. If the key of the first record is entered in the trie tree 1021, the third record is generated by using the first record and the second record including the key of the first record and included in the second table (step 1101). Then, the link to the leaf corresponding to the second record is deleted from the array 1022 (step 1102).

Next, when the key of the fourth record included in the first table if not entered in the trie tree 1021, the fifth record is generated by using the fourth record (step 1103). Then, the seventh record is generated by using the sixth record included in the second table corresponding to the leaf linked by the link remaining in the array 1022 (step 1104).

The output unit 1012 outputs the third, fifth, and seventh records (step 1105). The process in step 1103 may be performed before the process in step 1101.

In the table joining process above, a high-speed comparison using the trie tree 1021 may be performed, and an uncoupled record may be identified using the array 1022. Therefore, the full outer join of two tables may be efficiently performed. In addition, since the reference range of the memory is localized in the process of searching the link remaining in the array 1022, an uncoupled record may be quickly extracted.

When the table processing apparatus 1001 is realized by an information processing apparatus, the time taken to perform the table joining process is shortened, the load of the central processing unit (CPU) is reduced, and the performance of the apparatus is improved. Furthermore, when the master table includes a large number of records, and when the journal table is joined with a plurality of master tables, uncoupled records may be easily output in parallel.

Figure 12:
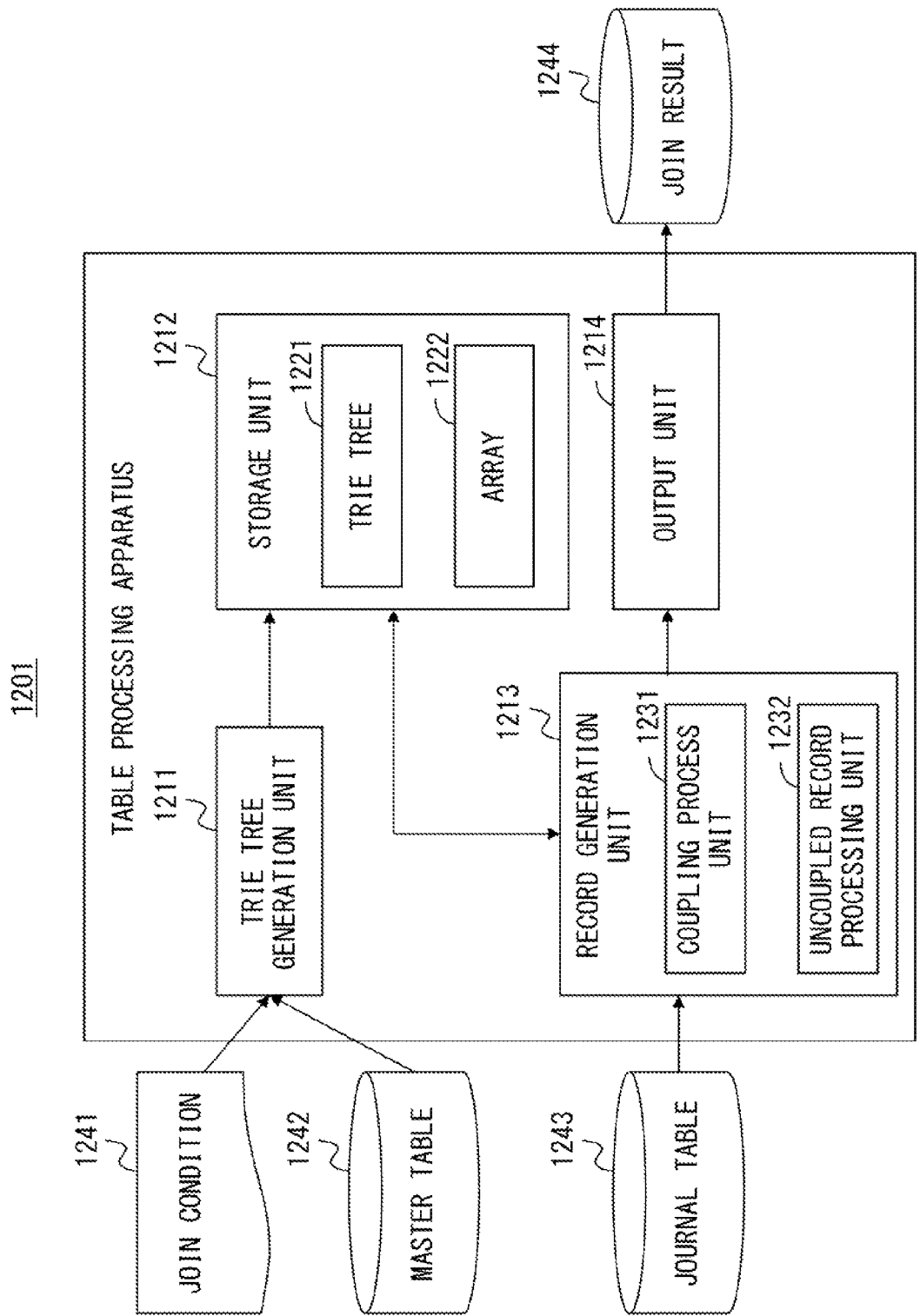
FIG. 12 is a functional configuration of the second table processing apparatus.

FIG. 12 is an example of a functional configuration of another table processing apparatus. A table processing apparatus 1201 in FIG. 12 includes a trie tree generation unit 1211, a storage unit 1212, a record generation unit 1213, and an output unit 1214. The record generation unit 1213 includes a coupling process unit 1231 and an uncoupled record processing unit 1232.

Figure 13:
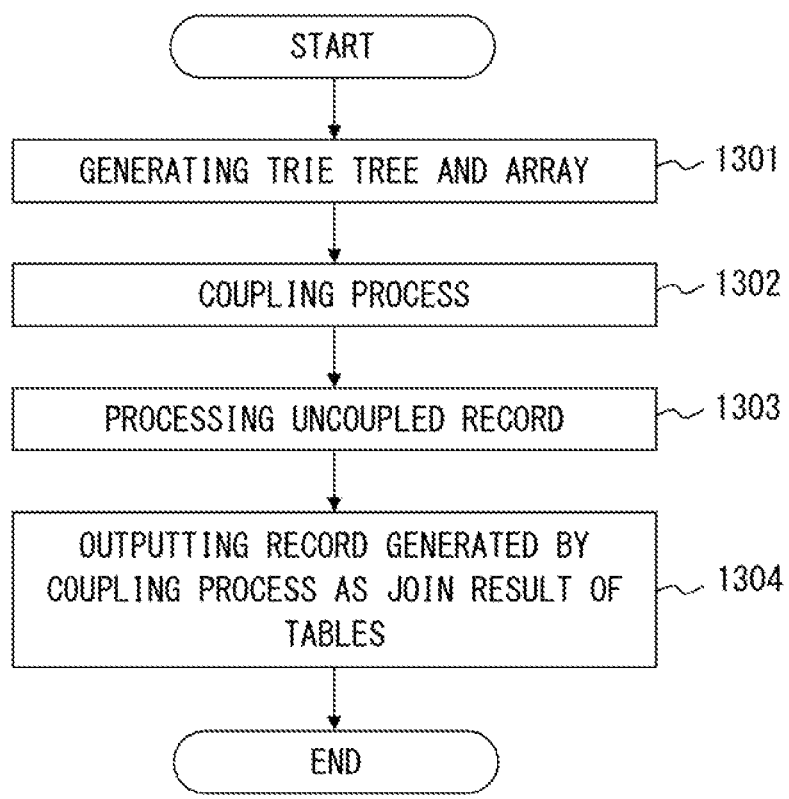
FIG. 13 is a flowchart of a second table joining process.

FIG. 13 is a flowchart of an example of a table joining process by the table processing apparatus 1201 in FIG. 12. First, the trie tree generation unit 1211 generates a trie tree 1221 and an array 1222 based on an input join condition 1241 and a master table 1242, and stores them in the storage unit 1212 (step 1301).

Next, the record generation unit 1213 performs the coupling process of coupling the records of the master table 1242 and the journal table 1243 with reference to the trie tree 1221, and updates the array 1222 (step 1302). Then, the record generation unit 1213 performs the uncoupled record processing of outputting uncoupled records based on the updated array 1222 (step 1303).

The output unit 1214 outputs the record generated by the record generation unit 1213 as a join result 1244 of the master table 1242 and the journal table 1243 (step 1304).

Figure 15:
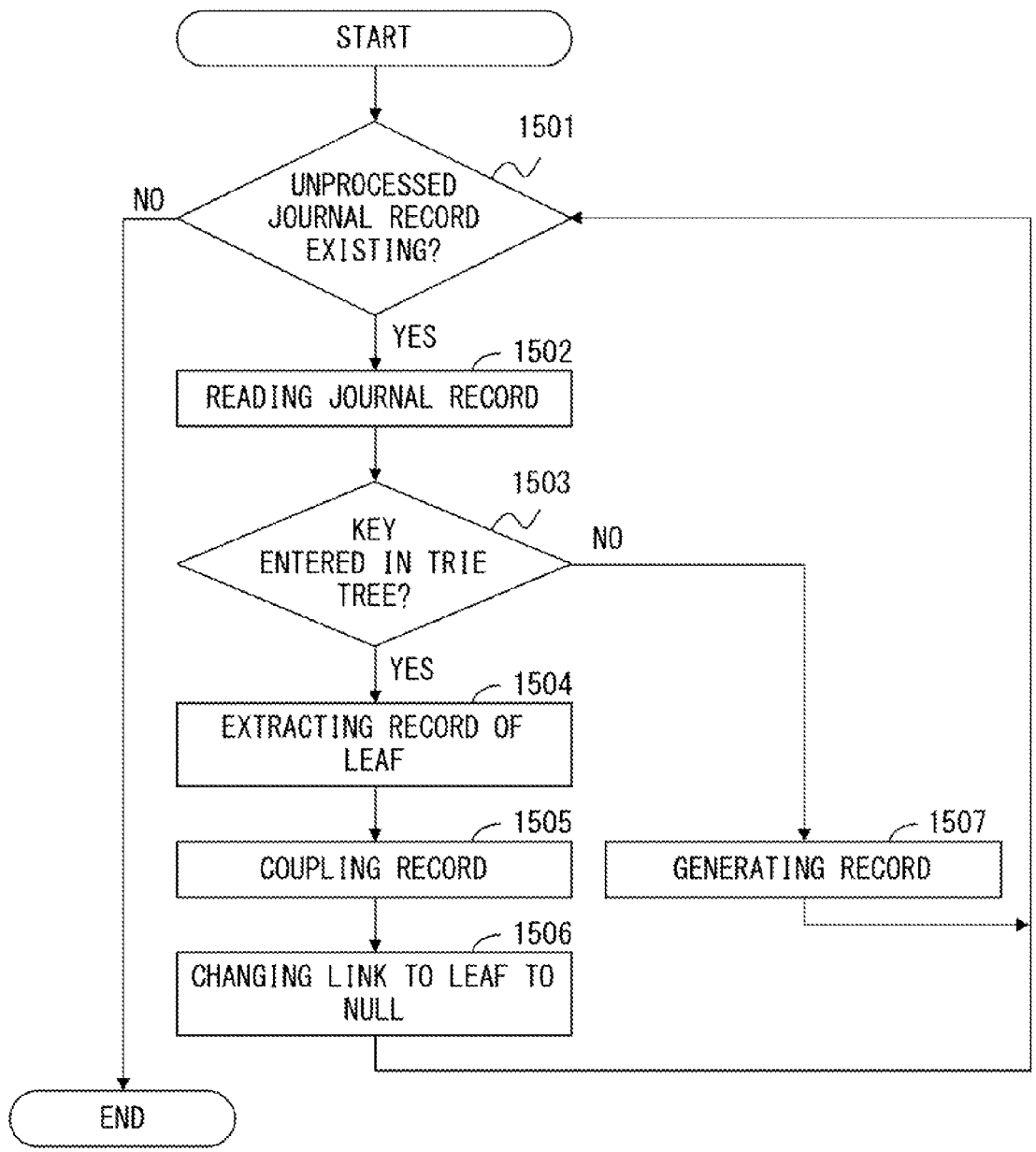
FIG. 15 is a flowchart of a coupling process.
Figure 16:
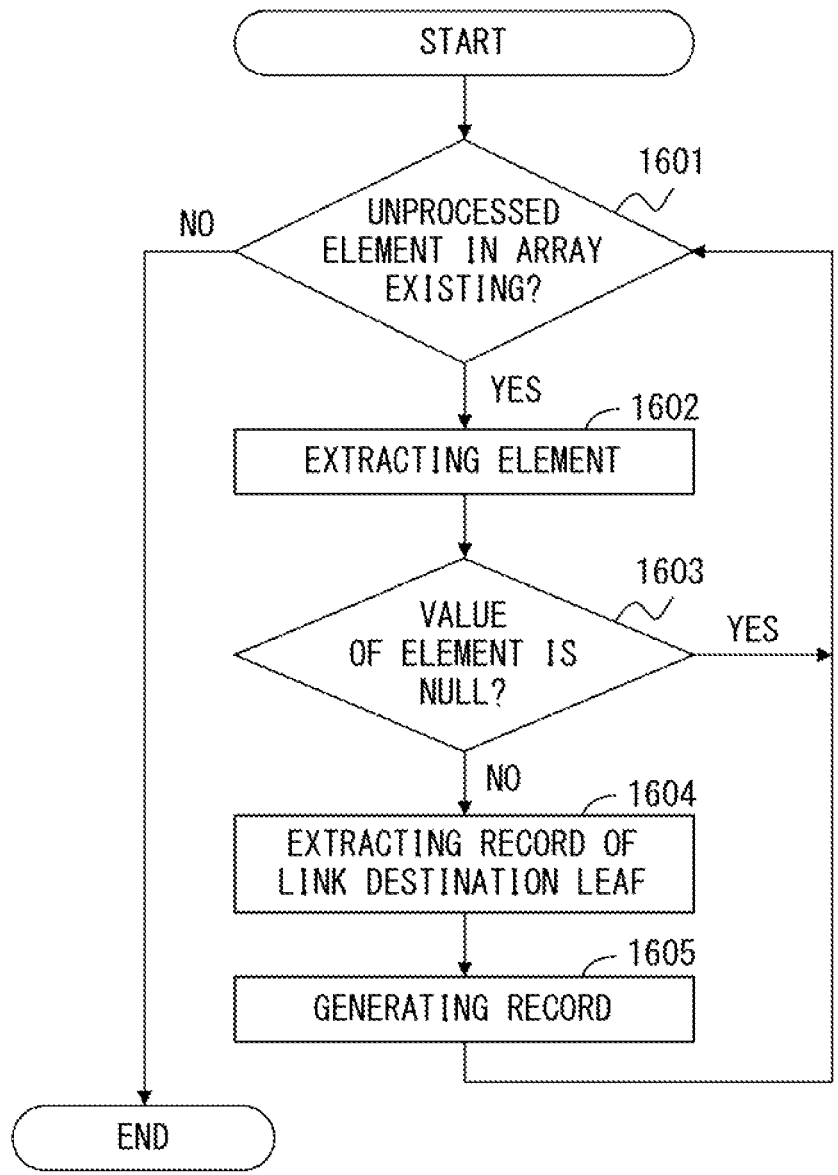
FIG. 16 is a flowchart of uncoupled record processing.

FIG. 14 is a flowchart of an example of the process of generating the trie tree 1221 and an array 1222 in step 1301 of FIG. 13. FIGS. 15 and 16 are flowcharts of examples of the coupling process in step 1302 and the uncoupled record processing in step 1303 of FIG. 13.

In the process in FIG. 14, the trie tree generation unit 1211 first checks whether or not there are unprocessed records in the records of the master table 1242 (step 1401). If there is an unprocessed record (YES in step 1401), an unprocessed record is read from the master table 1242 (step 1402). Then, it is checked whether or not the character string of the key item specified based on the join condition 1241 of the items of the read record has been, entered in the trie tree 1221 (step 1403).

If the character string of the key item has not been entered in the record 221 (NO in step S1403), the node of the trie tree 1221 corresponding to the character string is generated (step 1404), and the link to the read record is entered in the leaf of the terminal node (step 1405). Then, the link to the leaf of the terminal node is stored at the end of the array 1222 (step 1406), and the processes in and after step 1401 are repeated. For the first generated terminal node, the link to the leaf is stored at the head of the array 1222, and each element of the array 1222 is stored at each of the consecutive addresses in the memory.

On the other hand, if the character string of a key item has been entered in the trie tree 1221 (YES in step 1403), the processes in and after step 1405 are performed. When all records of the master table 1242 are processed (NO in step 1401), the process is terminated. Thus, the trie tree 1221 and the array 1222 are generated.

Figure 17:
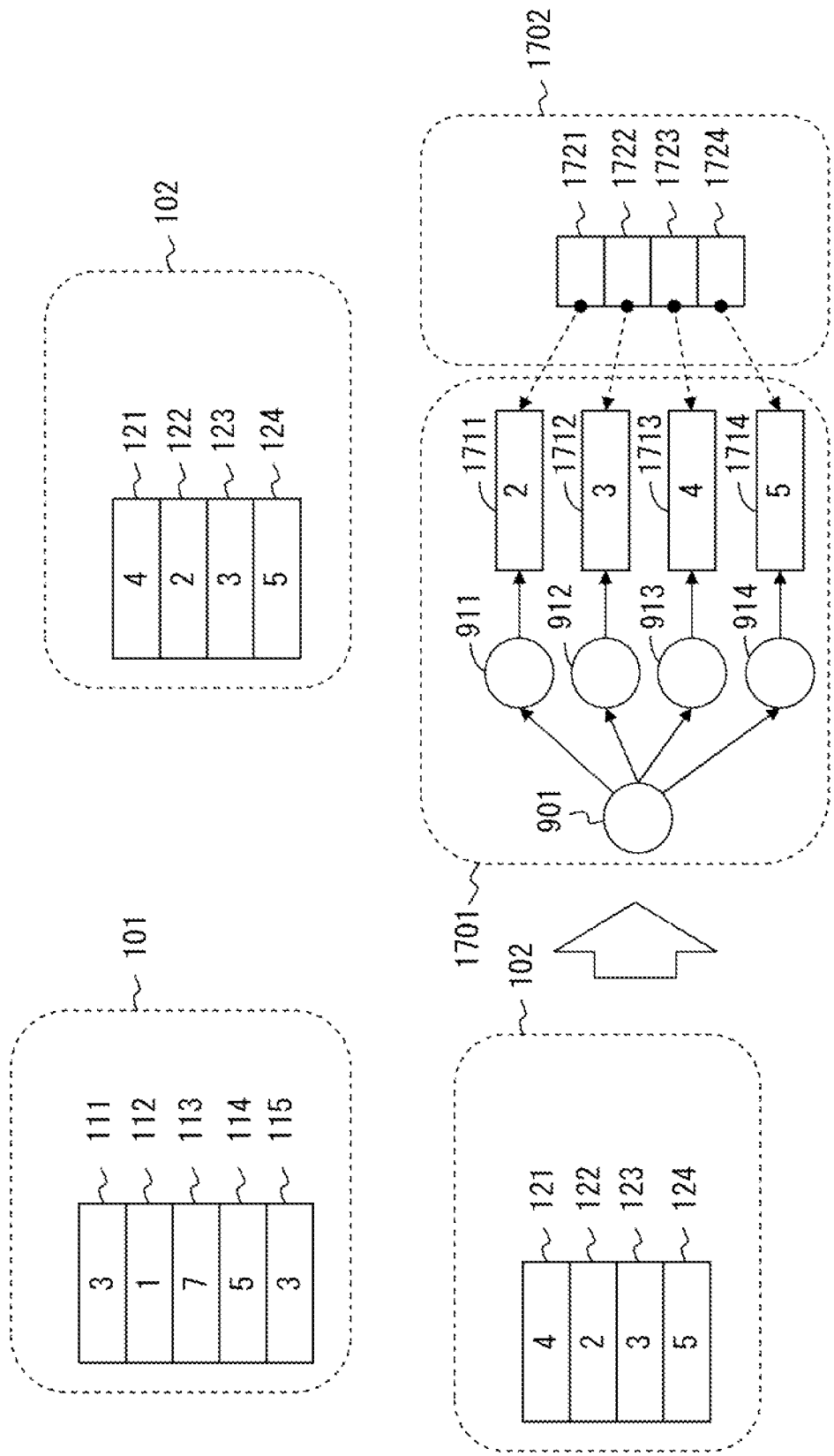
FIG. 17 illustrates a first trie tree and a first array.

For example, when the journal table 101 and the master table 102 are joined, using the value of each record as a key is specified as the join condition 1241. In this case, as illustrated in FIG. 17, the values of the four records 121 through 124 of the master table 102 are entered in the trie tree 1701. The trie tree 1701 includes the leading node 901 and the terminal nodes 911 through 914 illustrated in FIG. 9, and the terminal nodes 911 through 914 have the respective links to leaves 1711 through 1714. The leaves 1711 through 1714 have the respective links to the records 122, 123, 121, and 124. Then, the elements 1721 through 1724 of an array 1702 store the respective links to the leaves 1711 through 1714.

In the coupling process in FIG. 15, the coupling process unit 1231 of the record generation unit 1213 first checks whether or not there is an unprocessed record in the records of the journal table 1243 (step 1501). If there is an unprocessed record (YES in step 1501), one unprocessed record is read from the journal table 1243 (step 1502). Then, it is checked whether or not a character string of a hey item specified based on the join condition 1241 of the items of the read records is entered in the trie tree 1221 (step 1503).

If the character string of the key item, is entered in the trie tree 1221 (YES in step 1503), the leaf of the link destination of the terminal node of the trie tree 1221 corresponding to the character string is identified. Then, the record of the master table 1242 of the link destination of the leaf is extracted (step 1504).

Next, the read record of the journal table 1243 is coupled with the extracted record of the master table 1242, and a new record is generated (step 1505). Then, in the elements of the array 1222, the link to the leaf corresponding to the extracted record of the master table 1242 is changed to NULL, thereby deleting the link (step 1506), thus repeating the processes in and after step 1501.

On the other hand, unless the character string of a key item is entered in the trie tree 1221 (NO in step 1503), a new record is generated using the read record of the journal table 1243 (step 1507), and the processes in and after step 1501 are repeated. Then, when all records in the journal table 1243 are processed (NO in step 1501), the process is terminated.

Figure 18:
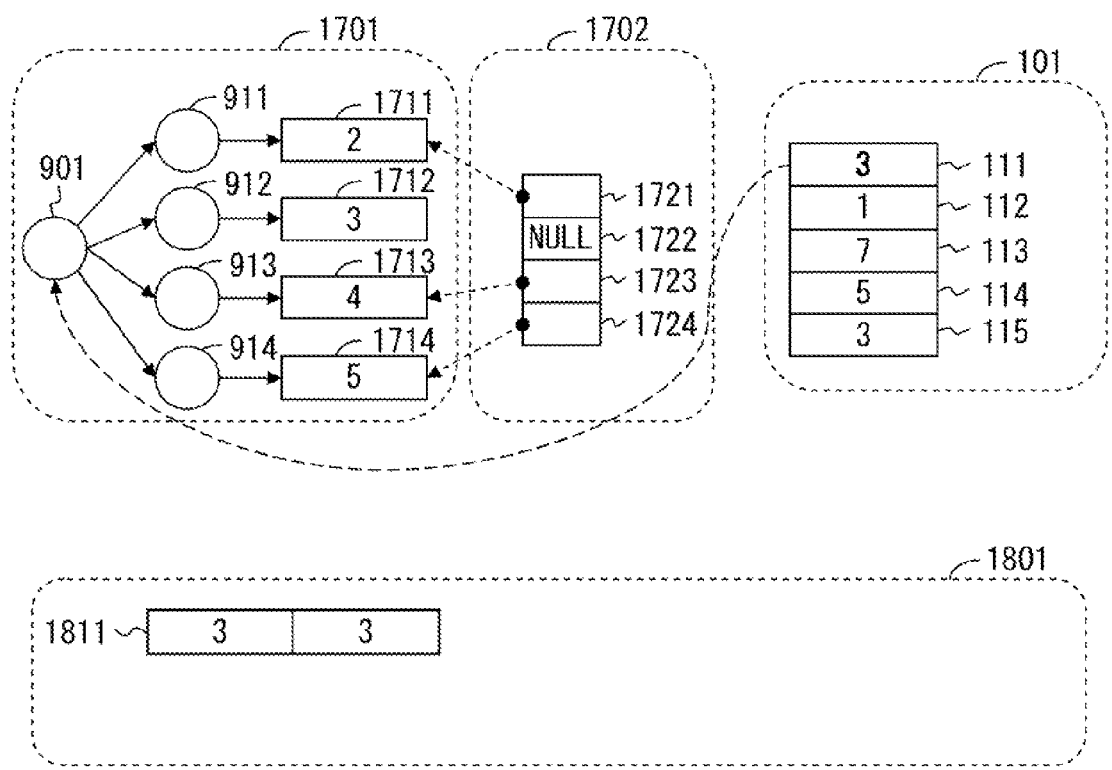
FIG. 18 is a view (1) of a first coupling process.

As illustrated in FIG. 18, when the leading record 111 of the journal table 101 is read, it is known that the value "3" of the record 111 has been entered in the terminal node 1712 by retrieving the value on the trie tree 1701. Then, the record 123 of the master table 102 at the link destination of the leaf 1712 of the terminal node 1712 is extracted, and a record 1811 obtained by coupling the record ill with the record 123 is generated. The generated record 1811 is stored as a record of a table 1801 as a join result. Then, the link to the leaf 1712 stored in an element 1722 of the array 1702 is changed to NULL.

Next, as illustrated in FIG. 19, when the next record 112 of the journal table 101 is read, the value "1" of the record 112 is searched for on the trie tree 1701, and it is known that the value is not entered in the trie tree 1701. Then, the record 1812 is generated using the record 112, and stored in the 1801.

Figure 20:
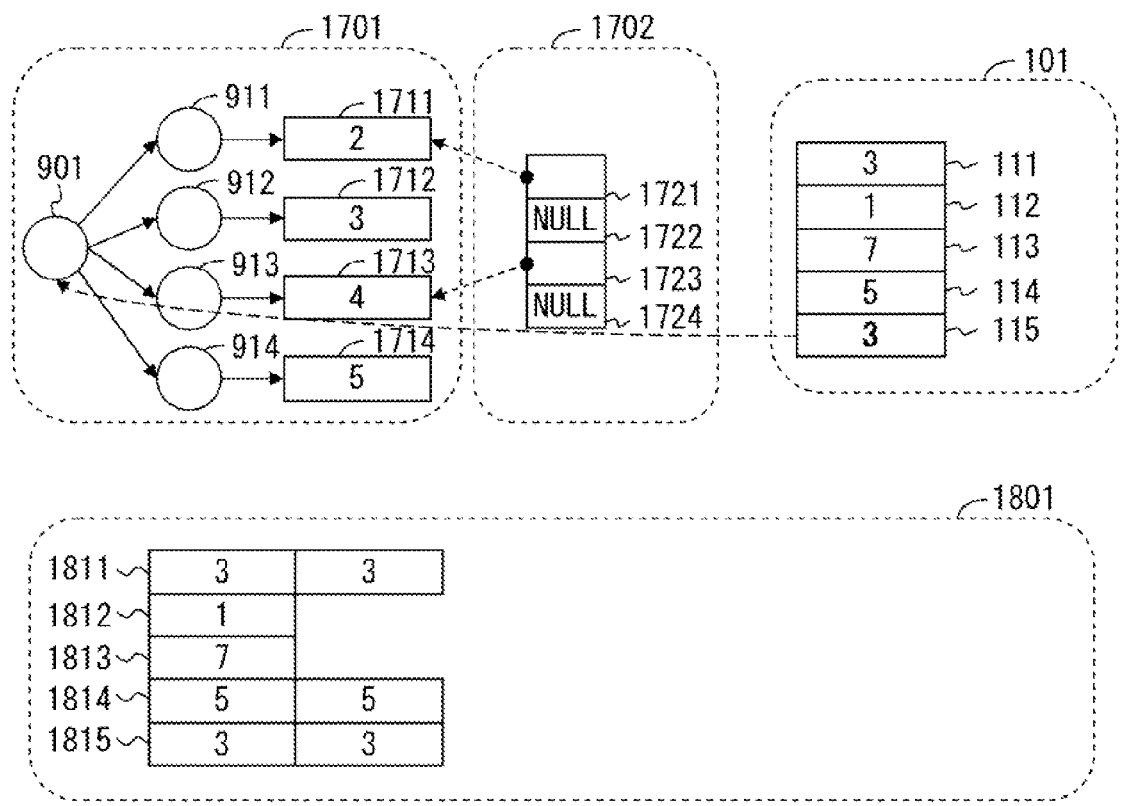
FIG. 20 is a view (3) of a first coupling process.

Similarly, as illustrated in FIG. 20, a record 1813 is generated using the next record 113 of the journal table 101. Then, a record 1314 obtained by coupling the record 114 with the record 124 of the master table 102 is generated, and a record 1815 obtained by coupling the record 115 with the record 123 of the master table 102 is generated. In this case, the link to the leaf 1714 stored in the element 1724 of the array 1702 is changed to NULL. When the process of the record 115 is completed, the coupling process terminates.

In the uncoupled record processing in FIG. 16, the uncoupled record processing unit 1232 of the record generation unit 1213 first checks whether or not there is an unprocessed element in the elements of the array 1222 (step 1601). If there is an unprocessed element (YES in step 1601), one unprocessed element is extracted from the journal table 1243 (step 1602). Then, it is checked whether or not the value of the extracted element is NULL (step 1603).

Unless the value of the element is NULL (NO in step 1603), the leaf at the link destination of the link stored in the element is identified. Then, the record of the master table 1242 at the link destination of the leaf is extracted (step 1604). Next, a new record is generated using a record of the master table 1242 (step 1605), and the processes in and after step 1601 are repeated.

On the other hand, if the value of an element is NULL (YES in step 1603), no new record is generated, and the processes in and after step 1601 are repeated. Then, when all elements of the array 1222 are processed (NO in step 1601), the process is terminated.

As illustrated in FIG. 21, when the element 1721 of the array 1702 is extracted, the value of the element 1721 is not NULL. Therefore, the record 122 of the master table 102 which is the link destination of the link destination leaf 1711 is extracted. Then, using the record 122, a record 1816 is generated, and stored in the table 1801. Since the value of the next element 1722 is NULL, no new record is generated.

When the next element 1723 is extracted, the value of the element 1723 is not NULL. Therefore, the record 121 of the master table 102 which is the link destination of the leaf 1713 at the link destination is extracted. Then, a record 1817 is generated using the record 121, and stored in the table 1801. Since the value of the next element 1724 is NULL, no new record is generated.

Thus, the table 1801 as a result of the full outer join of the journal table 101 and the master table 102 is generated. Since the respective elements of the array 1702 are stored at the consecutive addresses in the memory, the reference range of the memory is localized in the uncoupled record processing, thereby quickly extracting uncoupled records.

Next, the process of joining the master table in FIG. 22 with the journal table in FIG. 23 is described with reference to FIGS. 22 through 28.

The master table in FIG. 22 includes records 2201 through 2203, and each record includes a character string containing three items of "code", "product name", and "price". On the other hand, the journal table in FIG. 23 includes records 2301 through 2304, and each record includes a character string of three items of "date", "product number", and "number of products".

Furthermore, as the join condition 1241, for example, the following conditions may be specified.
Jcondition{join(Journal, Master, $product number==$code, "FULL OUTER")}
OutputDef{$date date, $product name product name, val($price)*val($number of products) sales}

In this example, the item name of each table is expressed with the symbol $ added, Jcondition indicates that a journal table and a master table are joined by the full outer join by using the item "product number" of the journal table and the item "code" of the master table as keys. On the other hand, OutputDef indicates that the table made of three items of "date", "product name", and "sales" as the join result 1244. As the item of "date", a character string of "date" of the journal table is output, and a character string of "product name" of the master table is output as the item of "product name". As the item of "sales", a product obtained by multiplying the value of "number of products" of the journal table by the value of "price" of the master table is output.

The join condition 1241 is not limited to the condition above, but another join condition obtained by changing a key item and the item of a join result may be specified.

Figure 24:
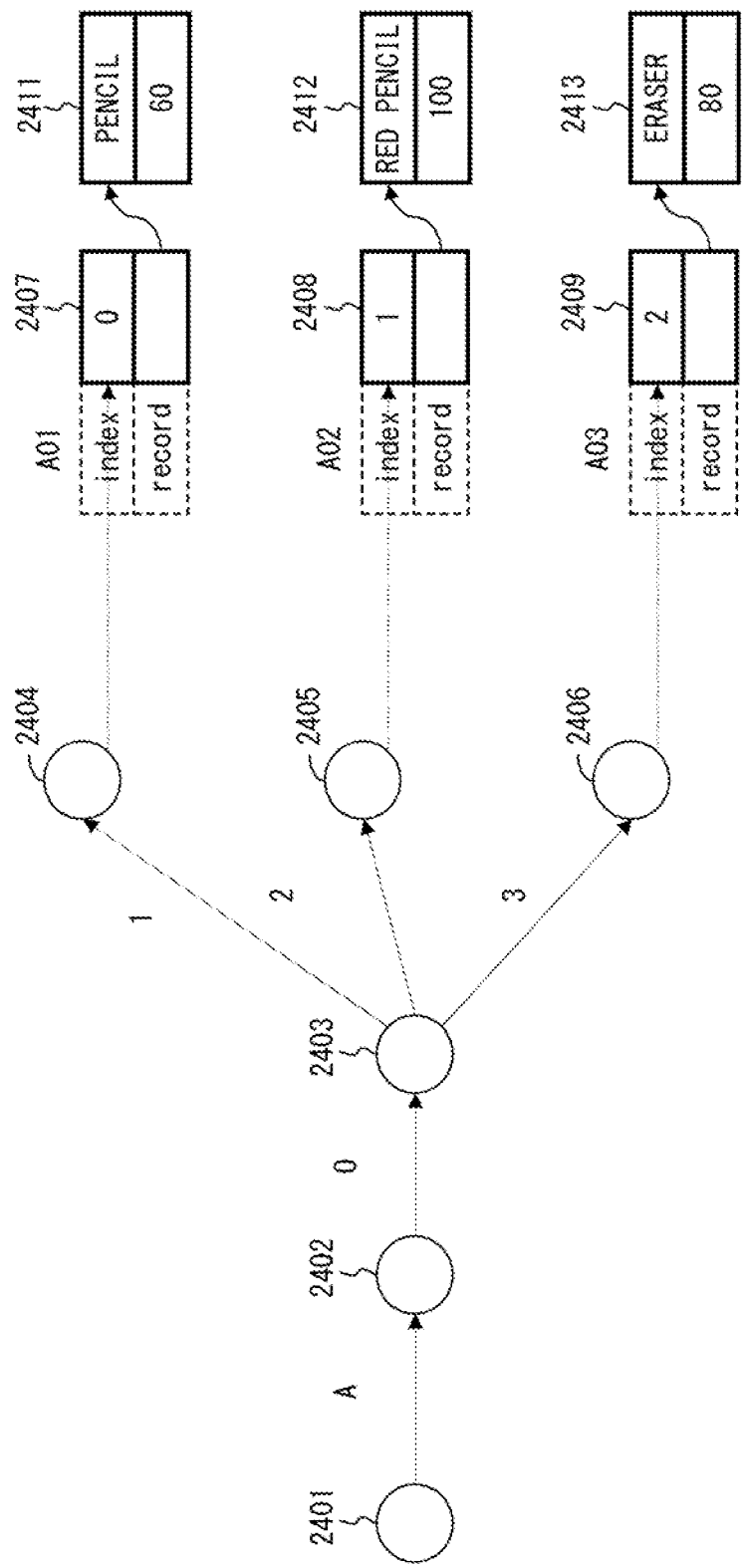
FIG. 24 illustrates a second trie tree.

When the above-mentioned condition is specified, as illustrated in FIG. 24, the character string "A01", "A02", and "A03" of "code" as a key item of the records 2201 through 2203 is entered in the trie tree 1221. The trie tree in FIG. 24 includes a leading node 2401, intermediate nodes 2402 and 2403, and terminal nodes 2404 through 2406, and the terminal nodes 2404 through 2406 have the respective links to leaves 2407 through 2409.

The terminal nodes 2404 through 2406 respectively correspond to the character strings "A01", "A02" and "A03", and the leaves 2407 through 2409 respectively have the links to records 2411 through 2413. The records 2411 through 2413 respectively correspond to the records 2201 through 2203 of the master table, and include only the character strings of "product name" and "price" used in generating the join result 1244. The values of the indexes of the leaves 2407 through 2409 are described later.

Figure 25:
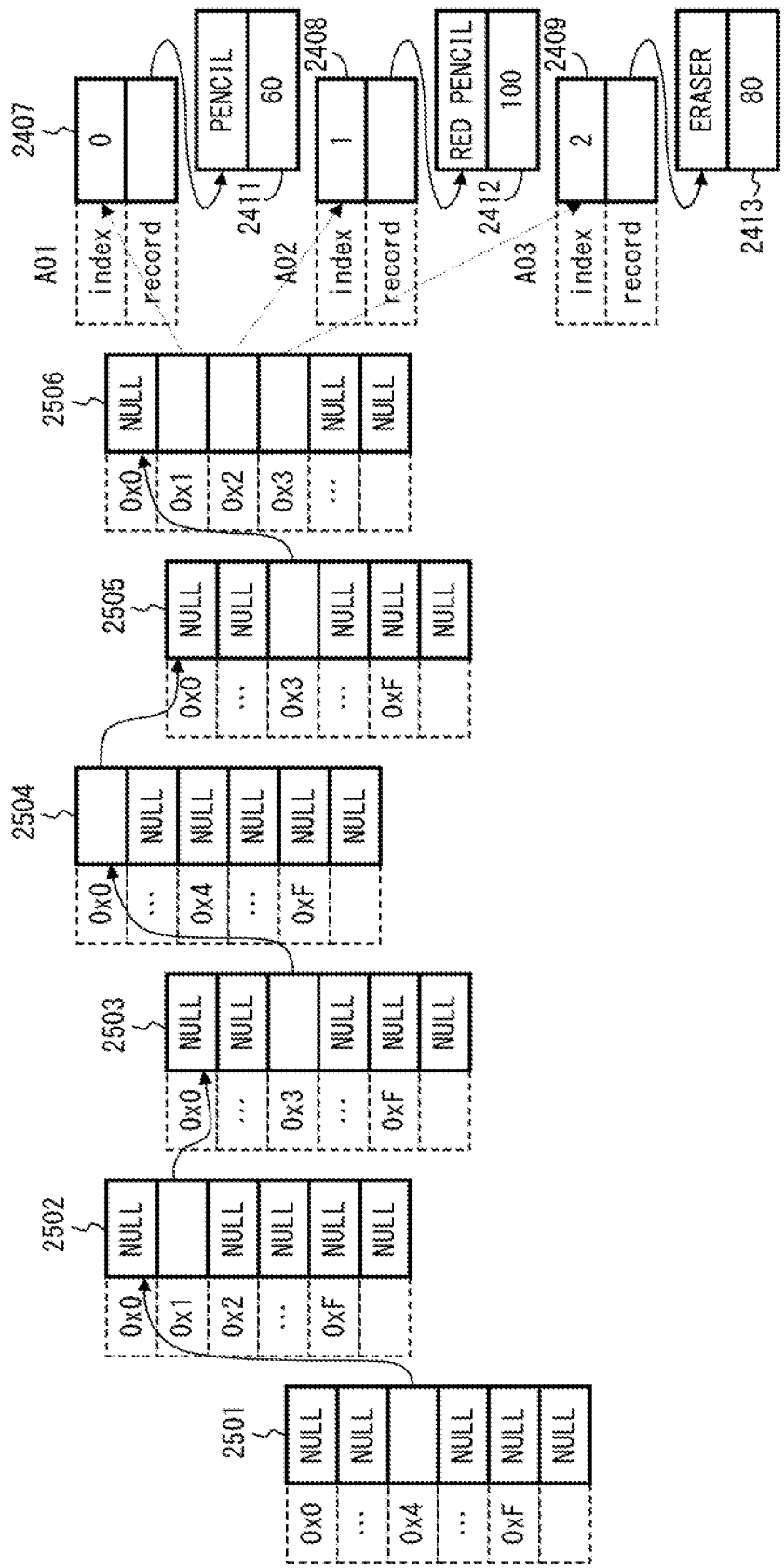
FIG. 25 illustrates a configuration of the second trie tree.

FIG. 25 is an example of a configuration of the trie tree in FIG. 24. The character strings "A01", "A02", and "A03" are converted into the following hexadecimal character codes according to the code table of the American Standard Code for Information Interchange (ASCII).

| A01 | 0x4 | 0x1 | 0x3 | 0x0 | 0x3 | 0x1 |
| A02 | 0x4 | 0x1 | 0x3 | 0x0 | 0x3 | 0x2 |
| A03 | 0x4 | 0x1 | 0x3 | 0x0 | 0x3 | 0x3 |

The trie tree in FIG. 25 includes arrays 2501 through 2506 in which the three character code strings are entered. The array 2501 is the array of the leading node, the arrays 2502 through 2505 are the arrays of intermediate nodes, and the array 2506 is the array of the terminal node. The index of each element of the arrays 2501 through 2506 is expressed by hexadecimal 0x1, 0x2, 0x3, etc., and the position of each index stores the link to the next array (leading address of the next array) or NULL, However, the array 2506 of the terminal node stores the link to a leaf instead of the link to the next array.

For example, the position of the index 0x4 of the array 2501 stores the link to the array 2502, the position of the index 0x1×1 of the array 2502 stores the link to the array 2503, the position of the index 0x3×3 of the array 2503 stores the link to the array 2504. The position of the index 0x0 of the array 2504 stores the link to the array 2505, and the position of the index 0x3 of the array 2505 stores the link to the array 2506. Then, the positions of the indexes 0x1, 0x2, and 0x3 of the array 2506 store the respective links to the leaves 2407 through 2409.

In the coupling process in FIG. 15, it is checked whether or not a character code string is entered in the trie tree by tracing the link stored in the arrays 2501 through 2506 by using each character code included in the character code string of the fey item of the read record as an index.

In the trie tree in FIG. 25, the entered character string is converted into the ASCII code, but may also be converted into other character codes. For example, a character code of the Japan Industrial Standard (JIS) code, the Shift-JIS code, the Extended Unix Code (EUC), Unicode, etc. may be used in entering a character string.

Figure 26:
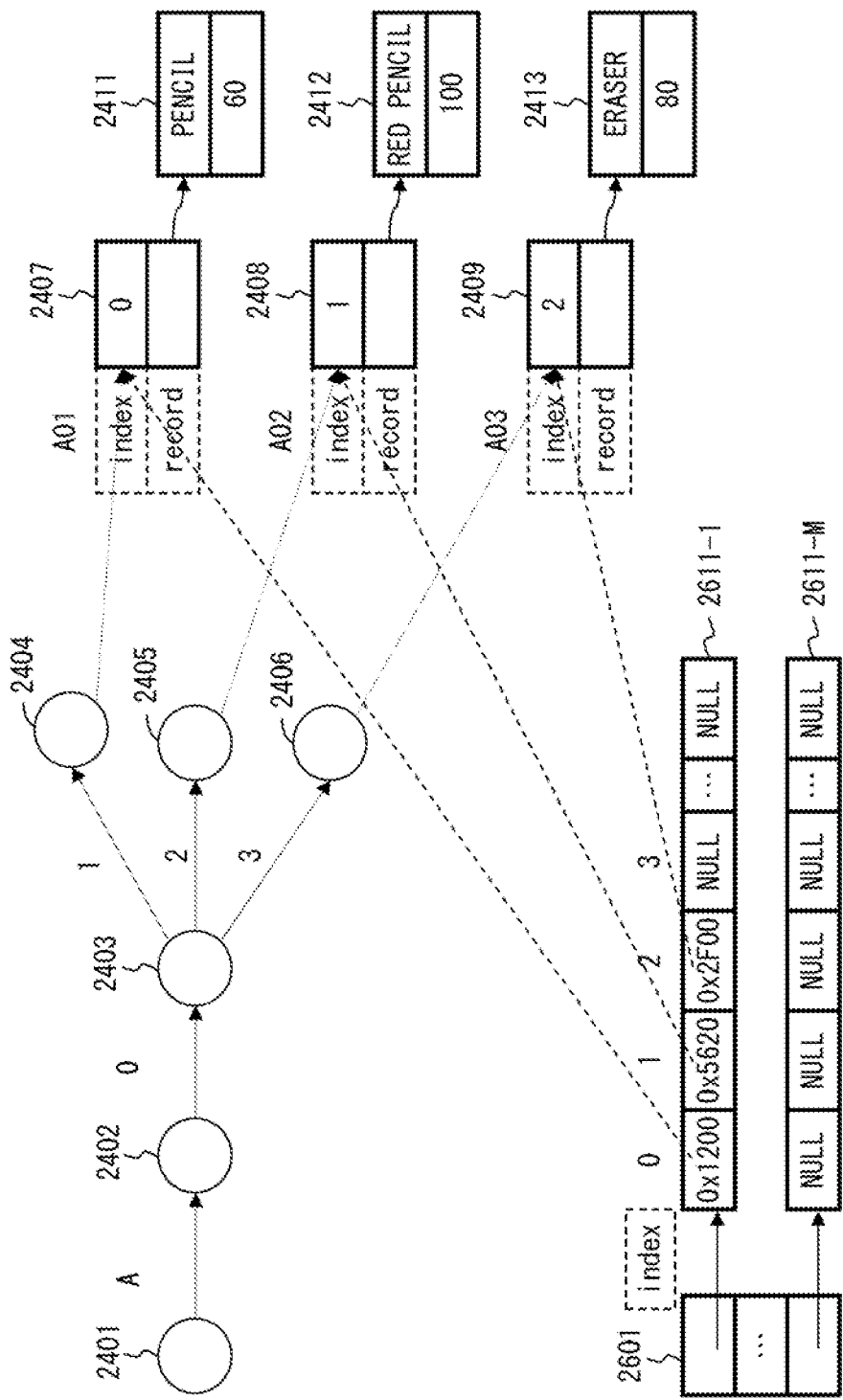
FIG. 26 illustrates the second trie tree and a second array.

FIG. 26 is an example of a configuration of the array 1222 generated with the trie tree in FIG. 24. In the example in FIG. 26, the array 1222 includes an array 2601 and M (M indicates an integer of one or more) arrays 2611-1 through 2611-M. The array 2601 has the link to the arrays 2611-1 through 2611-M. The index of each element of the arrays 2611-1 through 2611-M is expressed by 0, 1, 2, etc. in decimal, and the position, of each index stores the lint to the leaf of the trie tree or NULL at the position of each index.

For example, the leading addresses "0x1200", "0x5620", and "0x2F00" of the leaves 2407 through 2409 are respectively stored as the links to the leaves 2407 through 2409 in the positions of the indexes 0, 1, and 2 of the array 2611-1. The positions of other indexes of the arrays 2611-1 through 2611-M store NULL.

On the other hand, the leaves 2407 through 2409 respectively store the values of the indexes 0, 1, and 2 of the corresponding array 2611-1, and is used when the link to the leaf is changed into NULL in the coupling process in FIG. 15.

In the coupling process in FIG. 15, when the leading record 2301 of the journal table in FIG. 23 is read, it is known that a character string is entered in the terminal node 2406 by searching for the character string "A03" of the "product number" which is a key item of the record 2301.

Then, the record 2413 which is the link destination of the leaf 2409 of the terminal node 2406 is extracted, and a record 2711 obtained by coupling the record 2301 with the record 2413 is generated. In this case, according to OutputDef, the character string "2011/10/10" of "date" of the record 2301 is stored as the item of "date" of the record 2711. In addition, the character string "eraser" of "product name" of the record 2413 is stored as the item of "product name" of the record 2711. Then, the result "240" of multiplying the value "3" of the "number of products" of the record 2301 by the value "80" of "price" of the record 2413 is stored as an item of "sales" of the record 2711. The generated record 2711 is stored as a record of the table 2701 of the join result.

Next, using the value "2" of the index stored in the leaf 2409, the element of the index "2" of the array 2611-1 is accessed. Then, the leading address "0x2F00" of the leaf 2409 stored in the element is changed to NULL.

Figure 28:
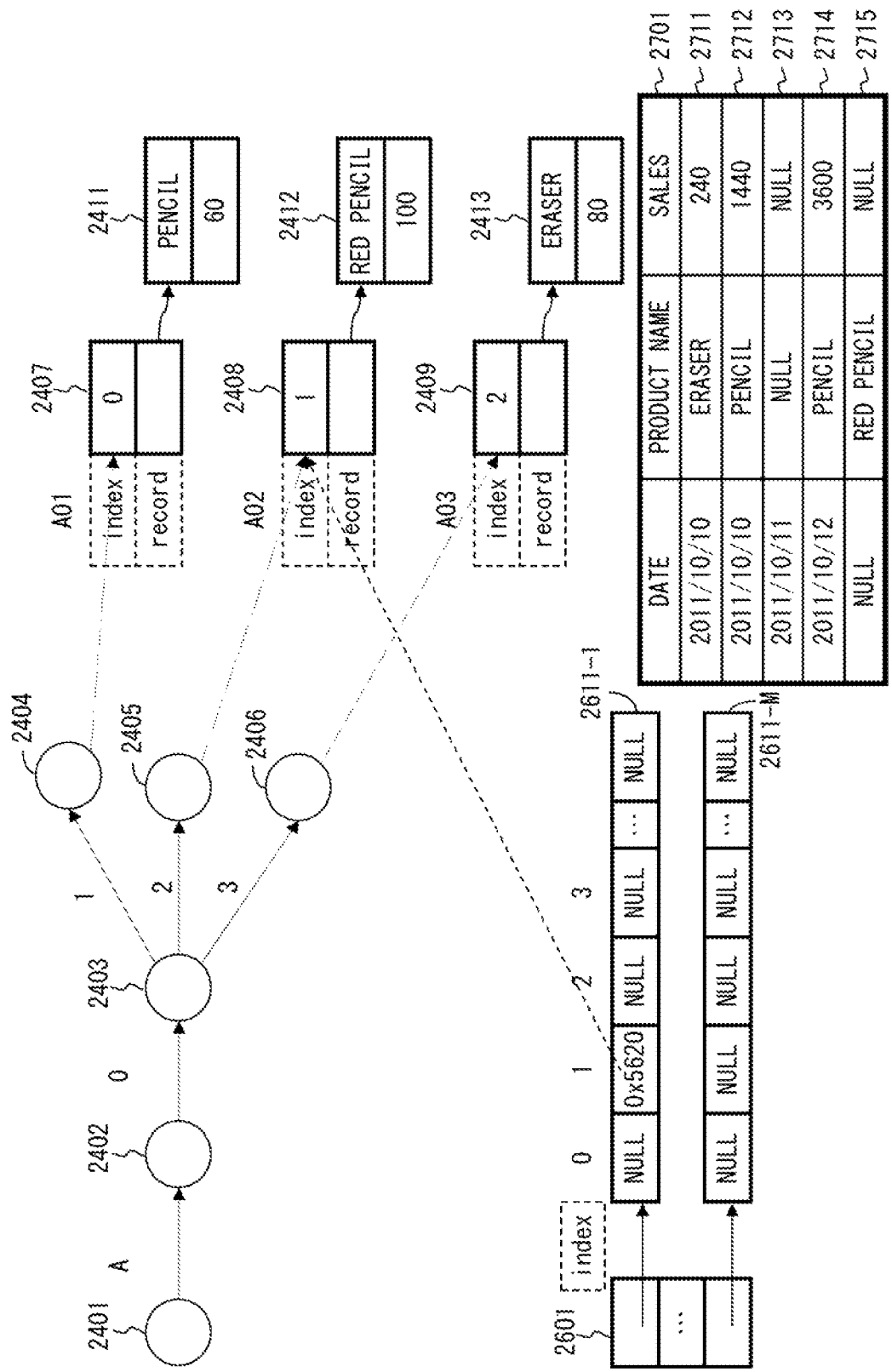
FIG. 28 illustrates a second uncoupled record process.

Next, when the record 2302 of the journal table is read, the character string "A01" of "product number" of the record 2302 is searched for on the trie tree, and it is known that the character string is entered in the terminal node 2404. Then, as illustrated in FIG. 28, the record 2411 which is the link destination of the leaf 2407 of the terminal node 2404 is extracted, a record 2712 obtained by coupling the record 2302 with the record 2411 is generated, and stored in the table 2701.

Next, using the value "0" of the index stored in the leaf 2407, the element of the index "0" of the array 2611-1 is accessed. Then, the leading address "0x1200" of the leaf 2407 stored in the element is changed to NULL.

Next, when the record 2303 of the journal table is read, the character string "A04" of "product number" of the record 2303 is searched for on the trie tree, and it is known that the character string is not entered in the trie tree. Then, the record 2713 is generated using the record 2303, and stored in the table 2701. In this case, according to OutputDef, the character string "2011/10/11" of "date" of the record 2303 is stored as the item of "date" of the record 2713. NULL is set in the items of "product name" and "sales" of the record 2713.

When the record 2304 of the journal table is read, the character string "A01" of "product number" of the record 2304 is searched for on the trie tree, and it is known that the character string is entered in the terminal node 2404. Then, the record 2411 of the link destination of the leaf 2407 of the terminal node 2404 is extracted, the record 2714 obtained by coupling the record 2304 with the record 2411 is generated and stored in the table 2701.

Next, using the value "0" of the index stored in the leaf 2407, the element of the index "0" of the array 2611-1 is accessed. In this case, since NULL has already been set in the element, the element is not changed. Then, since no unprocessed record is found, the coupling process is terminated.

In the uncoupled record processing in FIG. 16, when the element of the index "0" of the array 2611-1 is extracted, the value of the element is NULL. Therefore, no new corresponding record is generated.

Next, when the element of the index "1" is extracted, the value is not NULL. Therefore, the record 2412 which is the link destination of the leaf 2408 at the link destination is extracted. Then, the record 2715 is generated using the record 2412, and stored in the table 2701. In this case, according to OutputDef, the character string "red pencil" of "product name" of the record 2412 is stored as an item of "product name" of the record 2715. NULL is set in the items of "date" and "sales" of the record 2715.

Since the value of the element after the index "2" is NULL, no new corresponding record is generated. Thus, the table 2701 is generated as a result of the full outer join between the master table in FIG. 22 and the journal table in FIG. 23.

Each flowchart in FIGS. 13 through 16 is only an example, and a part of the process may be omitted or changed depending on the configuration or the condition of the table processing apparatus. For example, in steps 1505 and 1507 in FIG. 15 and step 1605 in FIG. 16, the output unit 1214 instead of the record generation unit 1213 may generate a record.

In addition, the table to be joined is not limited to the concrete examples in FIGS. 1, 22, and 23, but a table having other items may be used. The trie tree 1701 in FIG. 17 and the trie tree in FIG. 24 are the trie trees when equi join is specified as a join condition, but a trie tree may be similarly generated when non-equi join is specified. In the case of non-equi join, the number of transition arrows in the trie tree is larger than the number in the case of the equi join by reflecting the conditions that the character string of one of two tables matches a part of the character string of the other or that the numeric value of one table is included in the numeric range of the other table, etc.

The table processing apparatus 1001 in FIG. 10 and the table processing apparatus 1201 in FIG. 12 may be realized, for example, using the information processing apparatus as illustrated in FIG. 29.

The information processing apparatus in FIG. 29 includes a CPU 2901 (a processor), memory 2002, an input device 2903, an output device 2904, an external storage device 2905, a medium drive device 2906, and a network connection device 2907. These components are interconnected through a bus 2908.

The memory 2902 is, for example, a semiconductor memory such as a read only memory (ROM), a random access memory (RAM), a flash memory, etc., and stores a program and data to be used in a process. For example, the CPU 2901 performs the processes of the table processing apparatus 1001 and 1201 by executing a program using the memory 2902. The memory 2002 may be used as the storage unit 1013 in FIG. 10 or the storage unit 1212 in FIG. 12.

The input device 2903 is, for example, a keyboard, a pointing device, etc., and is used in inputting an instruction and information from a user or an operator. The output device 2904 is, for example, a display device, a printer, a speaker, etc., and is used in outputting an inquiry and a process result to a user or an operator. The process result includes the join result 1244 in FIG. 12.

The external storage device 2905 is, for example, a magnetic disk device, an critical disk device, a magneto optical disk device, a tape device, etc. The external storage device 2905 includes a hard disk drive. The information processing device may store a program and data in the external storage device 2905, and use them after loading them to the memory 2902.

The medium drive device 2906 drives the portable recording medium 2909 and accesses the stored contents. The portable recording medium 2909 is a memory device, a flexible disk, an optical disk, an magneto optical disk, etc. The portable recording medium 2909 includes a compact disk read only memory (CD-ROM), a digital versatile disk (DVD), a universal serial bus (USB) memory, etc. A user or an operator may store a program and data in the portable recording medium 2909, and use them after loading them to the memory 2902.

Thus, the computer-readable recording medium which stores a program and data used in various processes includes a physical (non-transitory) recording medium such as the memory 2902, the external storage device 2905, and the portable recording medium 2909, etc.

the network connection device 2907 is connected to a communication network such as a local area network (LAN), the Internet, etc. and converts data for communications. The information processing apparatus may receive a program and data from an external device through the network connection device 2907, and use them after loading them to the memory 2902.

It is not necessary to include all the components in FIG. 29, but a part of the components may be omitted depending on uses and conditions.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A computer-readable recording medium having stored therein a program for causing a computer to execute a process comprising:
   when a key of a first record included in a first table is entered in a trie tree in which a plurality of keys of a plurality of records included in a second table are entered, generating a third record by using the first record and a second record which includes the key of the first record and is included in the second table;
   deleting a link to a leaf corresponding to the second record from an array which stores a plurality of links to a plurality of leaves of the trie tree respectively corresponding to the plurality of records;
   generating a fifth record by using a fourth record included in the first table when a key of the fourth record is not entered in the trie tree;
   generating a seventh record by using a sixth record included in the second table corresponding to a leaf linked by a link remaining in the array; and
   outputting the third, fifth, and seventh records as a join result of the first table and the second table.

2. The recording medium according to claim 1, wherein the array stores the plurality of links in respective positions of a plurality of indexes, the plurality of leaves of the trie tree have a plurality of values of corresponding indexes, and the deleting the link to the leaf corresponding to the second record deletes a link stored in a position of a corresponding index of the array based on a value of an index of a leaf of the trie tree corresponding to the key of the first record.

3. The recording medium according to claim 2, wherein the deleting the link to the leaf corresponding to the second record changes the link stored in the position of the corresponding index of the array to NULL, and the generating the seventh record generates the seventh record by using the sixth record corresponding to a leaf linked by a link other than NULL stored in the array.

4. A table processing apparatus which generates a record from first and second tables, the table processing apparatus comprising:
   a memory configured to store a trie tree in which a plurality of keys of a plurality of records included in the second table are entered, and an array of a plurality of links to a plurality of leaves of the trie tree respectively corresponding to the plurality of records; and
   a processor configured to, when a key of a first record included in the first table is entered in the trie tree, generate a third record by using the first record and a second record which includes the key of the first record and is included in the second table, delete a link to a leaf corresponding to the second record from the array, generate a fifth record by using a fourth record included in the first table when a key of the fourth record is not entered in the trie tree, generate a seventh record by using a sixth record included in the second table corresponding to a leaf linked by a link remaining in the array, and output third, fifth, and seventh records as a join result of the first table and the second table.

5. A table processing method performed by a computer, the table processing method comprising:
   when a key of a first record included in a first table is entered in a trie tree in which a plurality of keys of a plurality of records included in a second table are entered, generating by a processor a third record by using the first record and a second record which includes the key of the first record and is included in the second table;

deleting by the processor a link to a leaf corresponding to the second record from an array which stores a plurality of links to a plurality of leaves of the trie tree respectively corresponding to the plurality of records;

generating by the processor a fifth record by using a fourth record included in the first table when a key of the fourth record is not entered in the trie tree;

generating by the processor a seventh record by using a sixth record included in the second table corresponding to a leaf linked in a link remaining in the array; and outputting the third, fifth, and seventh records as a join result of the first table and the second table.

* * * * *